United States Patent
Wu et al.

(10) Patent No.: US 11,617,026 B1
(45) Date of Patent: Mar. 28, 2023

(54) LENS SHADING CORRECTION FOR QUADRA IMAGE SENSORS

(71) Applicant: Apple Inc., Cupertino, CA (US)

(72) Inventors: Chihsin Wu, San Jose, CA (US); David R Pope, Campbell, CA (US); Sheng Lin, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/592,327

(22) Filed: Feb. 3, 2022

(51) Int. Cl.
*H04N 25/611* (2023.01)
*H04N 23/76* (2023.01)
*H04N 23/84* (2023.01)

(52) U.S. Cl.
CPC ........... *H04N 25/611* (2023.01); *H04N 23/76* (2023.01); *H04N 23/843* (2023.01)

(58) Field of Classification Search
CPC ..... H04N 25/611; H04N 23/76; H04N 23/843
See application file for complete search history.

(56) References Cited

U.S. PATENT DOCUMENTS

| | | | |
|---|---|---|---|
| 2011/0090380 A1* | 4/2011 | Cote | G06T 3/4015 348/246 |
| 2011/0091101 A1* | 4/2011 | Cote | H04N 25/134 382/167 |
| 2013/0321678 A1 | 12/2013 | Cote et al. | |
| 2020/0219441 A1 | 7/2020 | Wu | |
| 2020/0228770 A1 | 7/2020 | Yu | |
| 2021/0321065 A1 | 10/2021 | Wu et al. | |

FOREIGN PATENT DOCUMENTS

WO  WO 2021/091820 A1  5/2021

* cited by examiner

*Primary Examiner* — Twyler L Haskins
*Assistant Examiner* — Angel L Garces-Rivera
(74) *Attorney, Agent, or Firm* — Fenwick & West LLP

(57) ABSTRACT

Embodiments relate to processing of pixels captured by a quadra image sensor. A quadra image sensor includes a plurality of pixel tiles, each having a plurality of pixels corresponding to the same color. A lens shading correction (LSC) circuit receives, for each of a plurality of colors, a set of gain tables. Each gain table corresponds to a different channel associated with the color. Each gain table includes a set of gain values, each associated with a location. The LSC circuit determines a pixel gain value for each pixel in a pixel tile and scales the pixels in the pixel tile based on the determined pixel gain values.

20 Claims, 12 Drawing Sheets

FIG. 6B

| Gain Gba11 (XGb1,YGb1) | Gain Gba12 (XGb2, YGb1) | ... | Gain Gba1N (XGbN, YGb1) |
|---|---|---|---|
| Gain Gba21 (XGb1,YGb2) | Gain Gba22 (XGb2, YGb2) | ... | Gain Gba2N (XGbN, YGb2) |
| ... | ... | ... | ... |
| Gain GbaM1 (XGb1,YGbM) | Gain GbaM2 (XGb2, YGbM) | ... | Gain GbaMN (XGbN, YGbM) |

680

| Gain Gbb11 (XGb1,YGb1) | Gain Gbb12 (XGb2, YGb1) | ... | Gain Gbb1N (XGbN, YGb1) |
|---|---|---|---|
| Gain Gbb21 (XGb1,YGb2) | Gain Gbb22 (XGb2, YGb2) | ... | Gain Gbb2N (XGbN, YGb2) |
| ... | ... | ... | ... |
| Gain GbbM1 (XGb1,YGbM) | Gain GbbM2 (XGb2, YGbM) | ... | Gain GbbMN (XGbN, YGbM) |

682

| Gain Gbc11 (XGb1,YGb1) | Gain Gbc12 (XGb2, YGb1) | ... | Gain Gbc1N (XGbN, YGb1) |
|---|---|---|---|
| Gain Gbc21 (XGb1,YGb2) | Gain Gbc22 (XGb2, YGb2) | ... | Gain Gbc2N (XGbN, YGb2) |
| ... | ... | ... | ... |
| Gain GbcM1 (XGb1,YGbM) | Gain GbcM2 (XGb2, YGbM) | ... | Gain GbcMN (XGbN, YGbM) |

684

| Gain Gbd11 (XGb1,YGb1) | Gain Gbd12 (XGb2, YGb1) | ... | Gain Gbd1N (XGbN, YGb1) |
|---|---|---|---|
| Gain Gbd21 (XGb1,YGb2) | Gain Gbd22 (XGb2, YGb2) | ... | Gain Gbd2N (XGbN, YGb2) |
| ... | ... | ... | ... |
| Gain GbdM1 (XGb1,YGbM) | Gain GbdM2 (XGb2, YGbM) | ... | Gain GbdMN (XGbN, YGbM) |

LENS SHADING CORRECTION FOR QUADRA IMAGE SENSORS

BACKGROUND

1. Field of the Disclosure

The present disclosure relates a circuit and process for processing images and more specifically to lens shading correction (LSC) in an image captured by an image sensor operating in quadra mode.

2. Description of the Related Arts

A quadra configuration for an image sensor increases the pixel density of the image sensor without increasing the density of the color filter used with the image sensor. Specifically, a quadra image sensor includes a set of pixel tiles, each having a set of pixels corresponding to the same color. This defines four color channels for each color of the color filter. As such, the complexity for processing the pixels of an image captured with a quadra image sensor increases compared to an image sensor that does not use pixel tiles. This can lead to increased processing time for processing the pixels of images captured by a quadra image sensor, and increased complexity in the circuitry for processing the pixels of images captured by a quadra image sensor.

SUMMARY

Embodiments relate to processing of pixels captured by a quadra image sensor. A quadra image sensor includes a set of pixel tiles, each having a set of pixels corresponding to the same color. A lens shading correction (LSC) circuit receives, for each of a set of colors, a set of gain tables. Each gain table corresponds to a different channel associated with the color. Each gain table includes a set of gain values, each associated with a location. The LSC circuit determines a pixel gain value for each pixel in a pixel tile and scales the pixels in the pixel tile based on the determined pixel gain values. To determine a gain value for a first pixel of the pixel tile, the LSC circuit identifies, based on the location of the first pixel, a first set of gain values from a first gain table of the set of gain tables corresponding to the color of the pixel tile, and interpolates the identified first set of pixels based on a location associated with each gain value of the first set of gain values, and the location of the first pixel.

BRIEF DESCRIPTION OF THE DRAWINGS

FIGS. 6B through 6E illustrates a set of LSC gain tables for performing LSC in a quadra image sensor, according to one or more embodiments.

Figure 1:
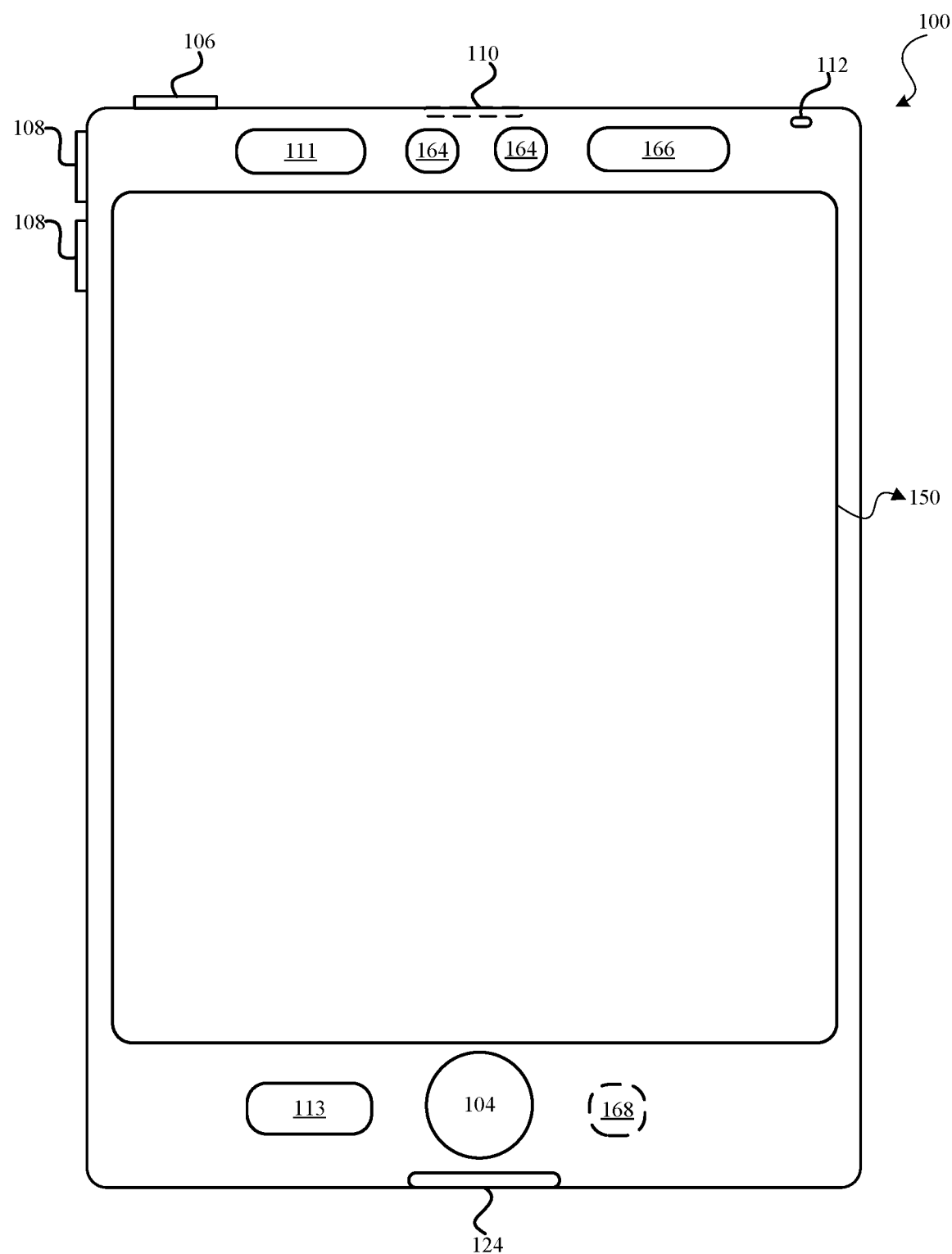
FIG. 1 is a high-level diagram of an electronic device, according to one or more embodiments

The figures depict, and the detail description describes, various non-limiting embodiments for purposes of illustration only.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, the described embodiments may be practiced without these specific details. In other instances, well-known methods, procedures, components, circuits, and networks have not been described in detail so as to not unnecessarily obscure aspects of the embodiments.

Embodiments relate to performing a lens shading correction (LSC) algorithm on pixels captured by a quadra image sensor. A quadra image sensor includes a set of pixel tiles, each having a set of pixels corresponding to the same color. The LSC circuit applies a pixel gain to each pixel of the raw image captured by the image sensor to compensate for vignetting that might be present in the image (e.g., due to limitations of a lens used for focusing light from a scene to the image sensor). The LSC circuit determines the pixel gain to apply to each pixel by extracting a set of gain values from a table corresponding to the color channel associated with the pixel and interpolates the extracted set of gain values based on a location associated with each of the gain values and the location of the pixel. The LSC circuit stores a gain table for each color channel of the quadra image sensor. That is, for each color of the image sensor, the LSC circuit stores multiple gain table, each corresponding to a different channel of that color. Furthermore, each gain table stored by the LSC circuit includes a set of gain values. Each gain value of a gain table is associated with a different location. Moreover, to improve the performance of the LSC circuit and to reduce the complexity of the LSC circuit, the gain values of gain tables corresponding to a same color are associated with a same set of locations. In some embodiments, the gain values of gain tables corresponding to different colors are associated with a different set of locations.

Exemplary Electronic Device

Embodiments of electronic devices, user interfaces for such devices, and associated processes for using such devices are described. In some embodiments, the device is a portable communications device, such as a mobile telephone, that also contains other functions, such as personal digital assistant (PDA) and/or music player functions. Exemplary embodiments of portable multifunction devices include, without limitation, the iPhone®, iPod Touch®, Apple Watch®, and iPad® devices from Apple Inc. of Cupertino, Calif. Other portable electronic devices, such as wearables, laptops or tablet computers, are optionally used. In some embodiments, the device is not a portable communications device, but is a desktop computer or other computing device that is not designed for portable use. In some embodiments, the disclosed electronic device may include a touch sensitive surface (e.g., a touch screen display and/or a touch pad). An example electronic device described below in conjunction with FIG. 1 (e.g., device 100) may include a touch-sensitive surface for receiving user input. The electronic device may also include one or more other physical user-interface devices, such as a physical keyboard, a mouse and/or a joystick.

Figure (FIG. 1 is a high-level diagram of an electronic device 100, according to one or more embodiments. Device 100 may include one or more physical buttons, such as a "home" or menu button 104. Menu button 104 is, for example, used to navigate to any application in a set of applications that are executed on device 100. In some embodiments, menu button 104 includes a fingerprint sensor that identifies a fingerprint on menu button 104. The fingerprint sensor may be used to determine whether a finger on menu button 104 has a fingerprint that matches a fingerprint stored for unlocking device 100. Alternatively, in some embodiments, menu button 104 is implemented as a soft key in a graphical user interface (GUI) displayed on a touch screen.

In some embodiments, device 100 includes touch screen 150, menu button 104, push button 106 for powering the device on/off and locking the device, volume adjustment buttons 108, Subscriber Identity Module (SIM) card slot 110, head set jack 112, and docking/charging external port 124. Push button 106 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. The device 100 includes various components including, but not limited to, a memory (which may include one or more computer readable storage mediums), a memory controller, one or more central processing units (CPUs), a peripherals interface, an RF circuitry, an audio circuitry, speaker 111, microphone 113, input/output (I/O) subsystem, and other input or control devices. Device 100 may include one or more image sensors 164, one or more proximity sensors 166, and one or more accelerometers 168. Device 100 may include more than one type of image sensors 164. Each type may include more than one image sensor 164. For example, one type of image sensors 164 may be cameras and another type of image sensors 164 may be infrared sensors that may be used for face recognition. In addition or alternatively, the image sensors 164 may be associated with different lens configuration. For example, device 100 may include rear image sensors, one with a wide-angle lens and another with as a telephoto lens. The device 100 may include components not shown in FIG. 1 such as an ambient light sensor, a dot projector and a flood illuminator.

Device 100 is only one example of an electronic device, and device 100 may have more or fewer components than listed above, some of which may be combined into a component or have a different configuration or arrangement. The various components of device 100 listed above are embodied in hardware, software, firmware or a combination thereof, including one or more signal processing and/or application specific integrated circuits (ASICs). While the components in FIG. 1 are shown as generally located on the same side as the touch screen 150, one or more components may also be located on an opposite side of device 100. For example, the front side of device 100 may include an infrared image sensor 164 for face recognition and another image sensor 164 as the front camera of device 100. The back side of device 100 may also include additional two image sensors 164 as the rear cameras of device 100.

Figure 2:
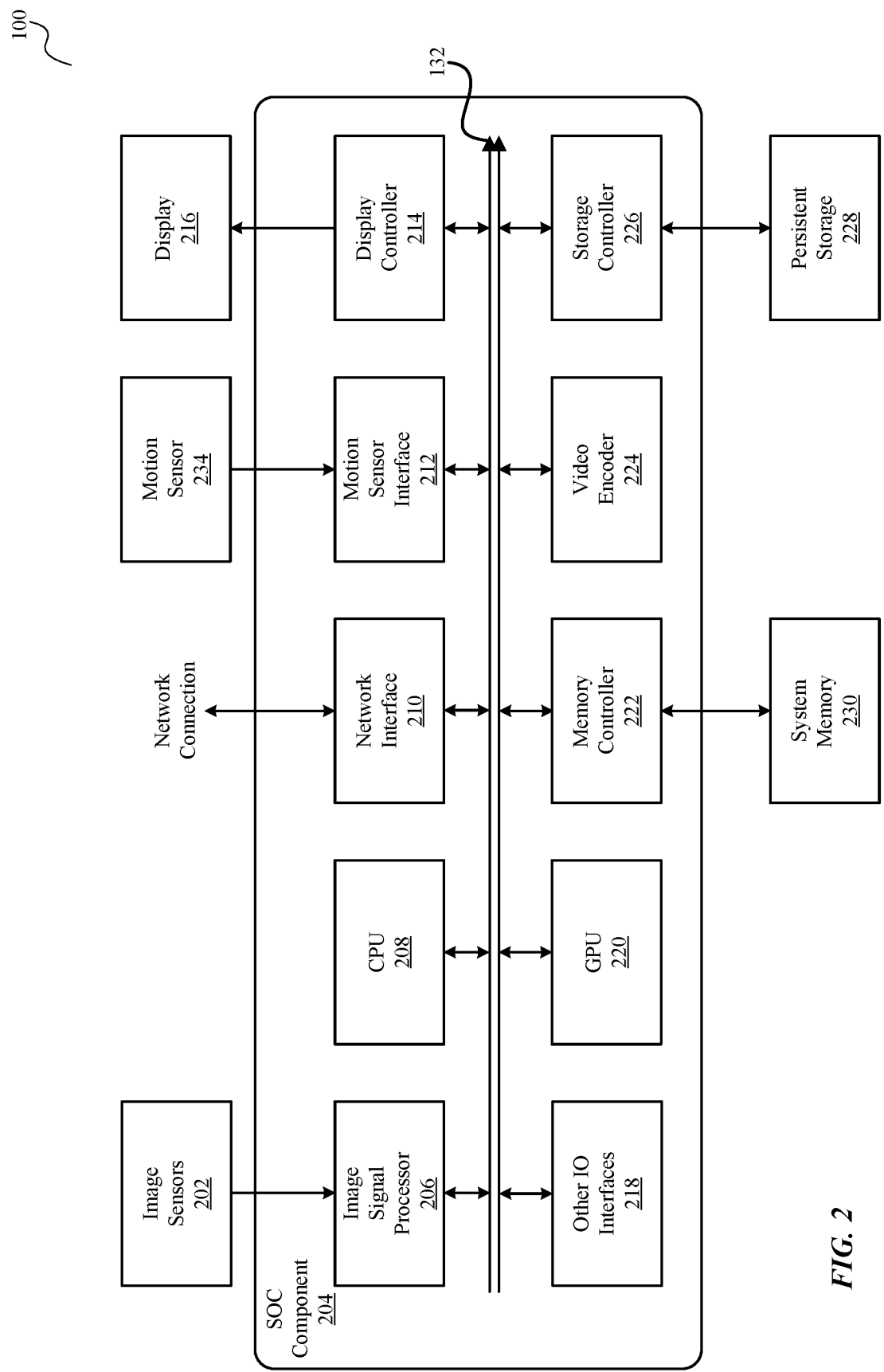
FIG. 2 is a block diagram illustrating components in the electronic device, according to one or more embodiments.

FIG. 2 is a block diagram illustrating components in device 100, according to one or more embodiments. Device 100 may perform various operations including image processing. For this and other purposes, the device 100 may include, among other components, image sensor 202, system-on-a chip (SOC) component 204, system memory 230, persistent storage (e.g., flash memory) 228, orientation sensor 234, and display 216. The components as illustrated in FIG. 2 are merely illustrative. For example, device 100 may include other components (such as speaker or microphone) that are not illustrated in FIG. 2. Further, some components (such as orientation sensor 234) may be omitted from device 100.

Image sensors 202 are components for capturing image data. Each of the image sensors 202 may be embodied, for example, as a complementary metal-oxide-semiconductor (CMOS) active-pixel sensor, a camera, video camera, or other devices. Image sensors 202 generate raw image data that is sent to SOC component 204 for further processing. In some embodiments, the image data processed by SOC component 204 is displayed on display 216, stored in system memory 230, persistent storage 228 or sent to a remote computing device via network connection. The raw image data generated by image sensors 202 may be in a Bayer color filter array (CFA) pattern (hereinafter also referred to as "Bayer pattern"). An image sensor 202 may also include optical and mechanical components that assist image sensing components (e.g., pixels) to capture images. The optical and mechanical components may include an aperture, a lens system, and an actuator that controls the lens position of the image sensor 202.

Motion sensor 234 is a component or a set of components for sensing motion of device 100. Motion sensor 234 may generate sensor signals indicative of orientation and/or acceleration of device 100. The sensor signals are sent to SOC component 204 for various operations such as turning on device 100 or rotating images displayed on display 216.

Display 216 is a component for displaying images as generated by SOC component 204. Display 216 may include, for example, liquid crystal display (LCD) device or an organic light emitting diode (OLED) device. Based on data received from SOC component 204, display 116 may display various images, such as menus, selected operating parameters, images captured by image sensor 202 and processed by SOC component 204, and/or other information received from a user interface of device 100 (not shown).

System memory 230 is a component for storing instructions for execution by SOC component 204 and for storing data processed by SOC component 204. System memory 230 may be embodied as any type of memory including, for example, dynamic random access memory (DRAM), synchronous DRAM (SDRAM), double data rate (DDR, DDR2, DDR3, etc.) RAMBUS DRAM (RDRAM), static RAM (SRAM) or a combination thereof. In some embodiments, system memory 230 may store pixel data or other image data or statistics in various formats.

Persistent storage 228 is a component for storing data in a non-volatile manner. Persistent storage 228 retains data even when power is not available. Persistent storage 228 may be embodied as read-only memory (ROM), flash memory or other non-volatile random access memory devices.

SOC component 204 is embodied as one or more integrated circuit (IC) chip and performs various data processing processes. SOC component 204 may include, among other subcomponents, image signal processor (ISP) 206, a central processor unit (CPU) 208, a network interface 210, motion sensor interface 212, display controller 214, graphics processor (GPU) 220, memory controller 222, video encoder 224, storage controller 226, and various other input/output (I/O) interfaces 218, and bus 232 connecting these subcomponents. SOC component 204 may include more or fewer subcomponents than those shown in FIG. 2.

ISP 206 is hardware that performs various stages of an image processing pipeline. In some embodiments, ISP 206 may receive raw image data from image sensor 202, and process the raw image data into a form that is usable by other subcomponents of SOC component 204 or components of device 100. ISP 206 may perform various image-manipulation operations such as image translation operations, horizontal and vertical scaling, color space conversion and/or image stabilization transformations, as described below in detail with reference to FIG. 3.

CPU 208 may be embodied using any suitable instruction set architecture, and may be configured to execute instructions defined in that instruction set architecture. CPU 208 may be general-purpose or embedded processors using any of a variety of instruction set architectures (ISAs), such as the x86, PowerPC, SPARC, RISC, ARM or MIPS ISAs, or any other suitable ISA. Although a single CPU is illustrated in FIG. 2, SOC component 204 may include multiple CPUs. In multiprocessor systems, each of the CPUs may commonly, but not necessarily, implement the same ISA.

Graphics processing unit (GPU) 220 is graphics processing circuitry for performing graphical data. For example, GPU 220 may render objects to be displayed into a frame buffer (e.g., one that includes pixel data for an entire frame). GPU 220 may include one or more graphics processors that may execute graphics software to perform a part or all of the graphics operation, or hardware acceleration of certain graphics operations.

I/O interfaces 218 are hardware, software, firmware or combinations thereof for interfacing with various input/output components in device 100. I/O components may include devices such as keypads, buttons, audio devices, and sensors such as a global positioning system. I/O interfaces 218 process data for sending data to such I/O components or process data received from such I/O components.

Network interface 210 is a subcomponent that enables data to be exchanged between devices 100 and other devices via one or more networks (e.g., carrier or agent devices). For example, video or other image data may be received from other devices via network interface 210 and be stored in system memory 230 for subsequent processing (e.g., via a back-end interface to image signal processor 206, such as discussed below in FIG. 3) and display. The networks may include, but are not limited to, Local Area Networks (LANs) (e.g., an Ethernet or corporate network) and Wide Area Networks (WANs). The image data received via network interface 210 may undergo image processing processes by ISP 206.

Motion sensor interface 212 is circuitry for interfacing with motion sensor 234. Motion sensor interface 212 receives sensor information from motion sensor 234 and processes the sensor information to determine the orientation or movement of the device 100.

Display controller 214 is circuitry for sending image data to be displayed on display 216. Display controller 214 receives the image data from ISP 206, CPU 208, graphic processor or system memory 230 and processes the image data into a format suitable for display on display 216.

Memory controller 222 is circuitry for communicating with system memory 230. Memory controller 222 may read data from system memory 230 for processing by ISP 206, CPU 208, GPU 220 or other subcomponents of SOC component 204. Memory controller 222 may also write data to system memory 230 received from various subcomponents of SOC component 204.

Video encoder 224 is hardware, software, firmware or a combination thereof for encoding video data into a format suitable for storing in persistent storage 128 or for passing the data to network interface w10 for transmission over a network to another device.

In some embodiments, one or more subcomponents of SOC component 204 or some functionality of these subcomponents may be performed by software components executed on ISP 206, CPU 208 or GPU 220. Such software components may be stored in system memory 230, persistent storage 228 or another device communicating with device 100 via network interface 210.

Image data or video data may flow through various data paths within SOC component 204. In one example, raw image data may be generated from the image sensors 202 and processed by ISP 206, and then sent to system memory 230 via bus 232 and memory controller 222. After the image data is stored in system memory 230, it may be accessed by video encoder 224 for encoding or by display 116 for displaying via bus 232.

In another example, image data is received from sources other than the image sensors 202. For example, video data may be streamed, downloaded, or otherwise communicated to the SOC component 204 via wired or wireless network. The image data may be received via network interface 210 and written to system memory 230 via memory controller 222. The image data may then be obtained by ISP 206 from system memory 230 and processed through one or more image processing pipeline stages, as described below in detail with reference to FIG. 3. The image data may then be returned to system memory 230 or be sent to video encoder 224, display controller 214 (for display on display 216), or storage controller 226 for storage at persistent storage 228.

Example Image Signal Processing Pipelines

Figure 3:
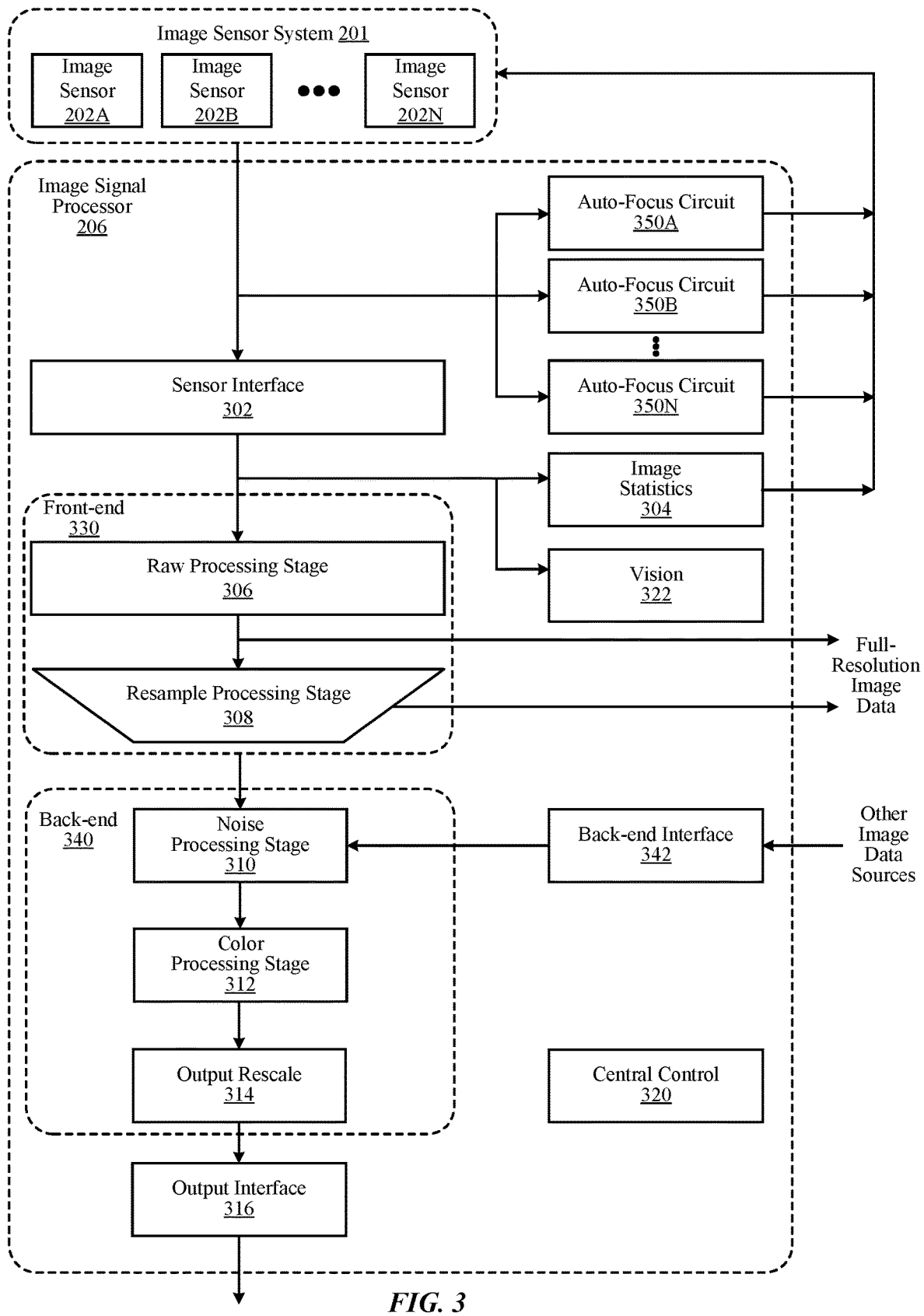
FIG. 3 is a block diagram illustrating image processing pipelines implemented using an image signal processor, according to one or more embodiments.

FIG. 3 is a block diagram illustrating image processing pipelines implemented using ISP 206, according to one or more embodiments. In the embodiment of FIG. 3, ISP 206 is coupled to an image sensor system 201 that includes one or more image sensors 202A through 202N (hereinafter collectively referred to as "image sensors 202" or also referred individually as "image sensor 202") to receive raw image data. The image sensor system 201 may include one or more sub-systems that control the image sensors 202 individually. In some cases, each image sensor 202 may operate independently while, in other cases, the image sensors 202 may share some components. For example, in one embodiment, two or more image sensors 202 may be share the same circuit board that controls the mechanical components of the image sensors (e.g., actuators that change the lens positions of each image sensor). The image sensing components of an image sensor 202 may include different types of image sensing components that may provide raw image data in different forms to the ISP 206. For example, in one embodiment, the image sensing components may include a plurality of focus pixels that are used for auto-focusing and a plurality of image pixels that are used for capturing images. In another embodiment, the image sensing pixels may be used for both auto-focusing and image capturing purposes.

ISP 206 implements an image processing pipeline which may include a set of stages that process image information from creation, capture or receipt to output. ISP 206 may include, among other components, sensor interface 302, central control 320, front-end pipeline stages 330, back-end pipeline stages 340, image statistics module 304, vision module 322, back-end interface 342, output interface 316, and auto-focus circuits 350A through 350N (hereinafter collectively referred to as "auto-focus circuits 350" or referred individually as "auto-focus circuits 350"). ISP 206 may include other components not illustrated in FIG. 3 or may omit one or more components illustrated in FIG. 3.

In one or more embodiments, different components of ISP 206 process image data at different rates. In the embodiment of FIG. 3, front-end pipeline stages 330 (e.g., raw processing stage 306 and resample processing stage 308) may process image data at an initial rate. Thus, the various different techniques, adjustments, modifications, or other processing operations performed by these front-end pipeline stages 330 at the initial rate. For example, if the front-end pipeline stages 330 process 2 pixels per clock cycle, then raw processing stage 306 operations (e.g., black level compensation, highlight recovery and defective pixel correction) may process 2 pixels of image data at a time. In contrast, one or more back-end pipeline stages 340 may process image data at a different rate less than the initial data rate. For example, in the embodiment of FIG. 3, back-end pipeline stages 340 (e.g., noise processing stage 310, color processing stage 312, and output rescale 314) may be processed at a reduced rate (e.g., 1 pixel per clock cycle).

Raw image data captured by image sensors 202 may be transmitted to different components of ISP 206 in different manners. In one embodiment, raw image data corresponding to the focus pixels may be sent to the auto-focus circuits 350 while raw image data corresponding to the image pixels may be sent to the sensor interface 302. In another embodiment, raw image data corresponding to both types of pixels may simultaneously be sent to both the auto-focus circuits 350 and the sensor interface 302.

Auto-focus circuits 350 may include hardware circuit that analyzes raw image data to determine an appropriate lens position of each image sensor 202. In one embodiment, the raw image data may include data that is transmitted from image sensing pixels that specializes in image focusing. In another embodiment, raw image data from image capture pixels may also be used for auto-focusing purpose. An auto-focus circuit 350 may perform various image processing operations to generate data that determines the appropriate lens position. The image processing operations may include cropping, binning, image compensation, scaling to generate data that is used for auto-focusing purpose. The auto-focusing data generated by auto-focus circuits 350 may be fed back to the image sensor system 201 to control the lens positions of the image sensors 202. For example, an image sensor 202 may include a control circuit that analyzes the auto-focusing data to determine a command signal that is sent to an actuator associated with the lens system of the image sensor to change the lens position of the image sensor. The data generated by the auto-focus circuits 350 may also be sent to other components of the ISP 206 for other image processing purposes. For example, some of the data may be sent to image statistics 304 to determine information regarding auto-exposure.

The auto-focus circuits 350 may be individual circuits that are separate from other components such as image statistics 304, sensor interface 302, front-end 330 and back-end 340. This allows the ISP 206 to perform auto-focusing analysis independent of other image processing pipelines. For example, the ISP 206 may analyze raw image data from the image sensor 202A to adjust the lens position of image sensor 202A using the auto-focus circuit 350A while performing downstream image processing of the image data from image sensor 202B simultaneously. In one embodiment, the number of auto-focus circuits 350 may correspond to the number of image sensors 202. In other words, each image sensor 202 may have a corresponding auto-focus circuit that is dedicated to the auto-focusing of the image sensor 202. The device 100 may perform auto focusing for different image sensors 202 even if one or more image sensors 202 are not in active use. This allows a seamless transition between two image sensors 202 when the device 100 switches from one image sensor 202 to another. For example, in one embodiment, a device 100 may include a wide-angle camera and a telephoto camera as a dual back camera system for photo and image processing. The device 100 may display images captured by one of the dual cameras and may switch between the two cameras from time to time. The displayed images may seamlessly transition from image data captured by one image sensor 202 to image data captured by another image sensor without waiting for the second image sensor 202 to adjust its lens position because two or more auto-focus circuits 350 may continuously provide auto-focus data to the image sensor system 201.

Raw image data captured by different image sensors 202 may also be transmitted to sensor interface 302. Sensor interface 302 receives raw image data from image sensor 202 and processes the raw image data into an image data processable by other stages in the pipeline. Sensor interface 302 may perform various preprocessing operations, such as image cropping, binning or scaling to reduce image data size. In some embodiments, pixels are sent from the image sensor 202 to sensor interface 302 in raster order (e.g., horizontally, line by line). The subsequent processes in the pipeline may also be performed in raster order and the result may also be output in raster order. Although only a single image sensor and a single sensor interface 302 are illustrated in FIG. 3, when more than one image sensor is provided in device 100, a corresponding number of sensor interfaces may be provided in ISP 206 to process raw image data from each image sensor.

Front-end pipeline stages 330 process image data in raw or full-color domains. Front-end pipeline stages 330 may include, but are not limited to, raw processing stage 306 and resample processing stage 308. A raw image data may be in Bayer raw format, for example. In Bayer raw image format, pixel data with values specific to a particular color (instead of all colors) is provided in each pixel. In an image capturing sensor, image data is typically provided in a Bayer pattern. Raw processing stage 306 may process image data in a Bayer raw format.

The operations performed by raw processing stage 306 include, but are not limited, sensor linearization, black level compensation, fixed pattern noise reduction, defective pixel correction, raw noise filtering, lens shading correction, white balance gain, and highlight recovery. Sensor linearization refers to mapping non-linear image data to linear space for other processing. Black level compensation refers to providing digital gain, offset and clip independently for each color component (e.g., Gr, R, B, Gb) of the image data. Fixed pattern noise reduction refers to removing offset fixed pattern noise and gain fixed pattern noise by subtracting a dark frame from an input image and multiplying different gains to pixels. Defective pixel correction refers to detecting defective pixels, and then replacing defective pixel values. Raw noise filtering refers to reducing noise of image data by averaging neighbor pixels that are similar in brightness. Highlight recovery refers to estimating pixel values for those pixels that are clipped (or nearly clipped) from other channels. Lens shading correction refers to applying a gain per pixel to compensate for a dropoff in intensity roughly proportional to a distance from a lens optical center. White balance gain refers to providing digital gains for white balance, offset and clip independently for all color components (e.g., Gr, R, B, Gb in Bayer format). Components of ISP 206 may convert raw image data into image data in full-color domain, and thus, raw processing stage 306 may process image data in the full-color domain in addition to or instead of raw image data.

Resample processing stage 308 performs various operations to convert, resample, or scale image data received from raw processing stage 306. Operations performed by resample processing stage 308 may include, but not limited to, demosaic operation, per-pixel color correction operation, Gamma mapping operation, color space conversion and downscaling or sub-band splitting. Demosaic operation refers to converting or interpolating missing color samples from raw image data (for example, in a Bayer pattern) to output image data into a full-color domain. Demosaic operation may include low pass directional filtering on the interpolated samples to obtain full-color pixels. Per-pixel color correction operation refers to a process of performing color correction on a per-pixel basis using information about relative noise standard deviations of each color channel to correct color without amplifying noise in the image data. Gamma mapping refers to converting image data from input image data values to output data values to perform gamma correction. For the purpose of Gamma mapping, lookup tables (or other structures that index pixel values to another value) for different color components or channels of each pixel (e.g., a separate lookup table for R, G, and B color components) may be used. Color space conversion refers to converting color space of an input image data into a different format. In one embodiment, resample processing stage 308 converts RGB format into YCbCr format for further processing.

Central control module 320 may control and coordinate overall operation of other components in ISP 206. Central control module 320 performs operations including, but not limited to, monitoring various operating parameters (e.g., logging clock cycles, memory latency, quality of service, and state information), updating or managing control parameters for other components of ISP 206, and interfacing with sensor interface 302 to control the starting and stopping of other components of ISP 206. For example, central control module 320 may update programmable parameters for other components in ISP 206 while the other components are in an idle state. After updating the programmable parameters, central control module 320 may place these components of ISP 206 into a run state to perform one or more operations or tasks. Central control module 320 may also instruct other components of ISP 206 to store image data (e.g., by writing to system memory 230 in FIG. 2) before, during, or after resample processing stage 308. In this way full-resolution image data in raw or full-color domain format may be stored in addition to or instead of processing the image data output from resample processing stage 308 through backend pipeline stages 340.

Image statistics module 304 performs various operations to collect statistic information associated with the image data. The operations for collecting statistics information may include, but not limited to, sensor linearization, replace patterned defective pixels, sub-sample raw image data, detect and replace non-patterned defective pixels, black level compensation, lens shading correction, and inverse black level compensation. After performing one or more of such operations, statistics information such as 3A statistics (Auto white balance (AWB), auto exposure (AE), histograms (e.g., 2D color or component) and any other image data information may be collected or tracked. In some embodiments, certain pixels' values, or areas of pixel values may be excluded from collections of certain statistics data when preceding operations identify clipped pixels. Although only a single statistics module 304 is illustrated in FIG. 3, multiple image statistics modules may be included in ISP 206. For example, each image sensor 202 may correspond to an individual image statistics unit 304. In such embodiments, each statistic module may be programmed by central control module 320 to collect different information for the same or different image data.

Vision module 322 performs various operations to facilitate computer vision operations at CPU 208 such as facial detection in image data. The vision module 322 may perform various operations including pre-processing, global tone-mapping and Gamma correction, vision noise filtering, resizing, keypoint detection, generation of histogram-of-orientation gradients (HOG) and normalized cross correlation (NCC). The pre-processing may include subsampling or binning operation and computation of luminance if the input image data is not in YCrCb format. Global mapping and Gamma correction can be performed on the pre-processed data on luminance image. Vision noise filtering is performed to remove pixel defects and reduce noise present in the image data, and thereby, improve the quality and performance of subsequent computer vision algorithms. Such vision noise filtering may include detecting and fixing dots or defective pixels, and performing bilateral filtering to reduce noise by averaging neighbor pixels of similar brightness. Various vision algorithms use images of different sizes and scales. Resizing of an image is performed, for example, by binning or linear interpolation operation. Keypoints are locations within an image that are surrounded by image patches well suited to matching in other images of the same scene or object. Such keypoints are useful in image alignment, computing camera pose and object tracking. Keypoint detection refers to the process of identifying such keypoints in an image. HOG provides descriptions of image patches for tasks in mage analysis and computer vision. HOG can be generated, for example, by (i) computing horizontal and vertical gradients using a simple difference filter, (ii) computing gradient orientations and magnitudes from the horizontal and vertical gradients, and (iii) binning the gradient orientations. NCC is the process of computing spatial cross-correlation between a patch of image and a kernel.

Back-end interface 342 receives image data from other image sources than image sensor 102 and forwards it to other components of ISP 206 for processing. For example, image data may be received over a network connection and be stored in system memory 230. Back-end interface 342 retrieves the image data stored in system memory 230 and provides it to back-end pipeline stages 340 for processing. One of many operations that are performed by back-end interface 342 is converting the retrieved image data to a format that can be utilized by back-end processing stages 340. For instance, back-end interface 342 may convert RGB, YCbCr 4:2:0, or YCbCr 4:2:2 formatted image data into YCbCr 4:4:4 color format.

Back-end pipeline stages 340 processes image data according to a particular full-color format (e.g., YCbCr 4:4:4 or RGB). In some embodiments, components of the back-end pipeline stages 340 may convert image data to a particular full-color format before further processing. Back-end pipeline stages 340 may include, among other stages, noise processing stage 310 and color processing stage 312. Back-end pipeline stages 340 may include other stages not illustrated in FIG. 3.

Noise processing stage 310 performs various operations to reduce noise in the image data. The operations performed by noise processing stage 310 include, but are not limited to, color space conversion, gamma/de-gamma mapping, temporal filtering, noise filtering, luma sharpening, and chroma noise reduction. The color space conversion may convert an image data from one color space format to another color space format (e.g., RGB format converted to YCbCr format). Gamma/de-gamma operation converts image data from input image data values to output data values to perform gamma correction or reverse gamma correction. Temporal filtering filters noise using a previously filtered image frame to reduce noise. For example, pixel values of a prior image frame are combined with pixel values of a current image frame. Noise filtering may include, for example, spatial noise filtering. Luma sharpening may sharpen luma values of pixel data while chroma suppression may attenuate chroma to gray (e.g., no color). In some embodiment, the luma sharpening and chroma suppression may be performed simultaneously with spatial nose filtering. The aggressiveness of noise filtering may be determined differently for different regions of an image. Spatial noise filtering may be included as part of a temporal loop implementing temporal filtering. For example, a previous image frame may be processed by a temporal filter and a spatial noise filter before being stored as a reference frame for a next image frame to be processed. In other embodiments, spatial noise filtering may not be included as part of the temporal loop for temporal filtering (e.g., the spatial noise filter may be applied to an image frame after it is stored as a reference image frame and thus the reference frame is not spatially filtered.

Color processing stage 312 may perform various operations associated with adjusting color information in the image data. The operations performed in color processing stage 312 include, but are not limited to, local tone mapping, gain/offset/clip, color correction, three-dimensional color lookup, gamma conversion, and color space conversion. Local tone mapping refers to spatially varying local tone curves in order to provide more control when rendering an image. For instance, a two-dimensional grid of tone curves (which may be programmed by the central control module 320) may be bi-linearly interpolated such that smoothly varying tone curves are created across an image. In some embodiments, local tone mapping may also apply spatially varying and intensity varying color correction matrices, which may, for example, be used to make skies bluer while turning down blue in the shadows in an image. Digital gain/offset/clip may be provided for each color channel or component of image data. Color correction may apply a color correction transform matrix to image data. 3D color lookup may utilize a three dimensional array of color component output values (e.g., R, G, B) to perform advanced tone mapping, color space conversions, and other color transforms. Gamma conversion may be performed, for example, by mapping input image data values to output data values in order to perform gamma correction, tone mapping, or histogram matching. Color space conversion may be implemented to convert image data from one color space to another (e.g., RGB to YCbCr). Other processing techniques may also be performed as part of color processing stage 312 to perform other special image effects, including black and white conversion, sepia tone conversion, negative conversion, or solarize conversion.

Output rescale module 314 may resample, transform and correct distortion on the fly as the ISP 206 processes image data. Output rescale module 314 may compute a fractional input coordinate for each pixel and uses this fractional coordinate to interpolate an output pixel via a polyphase resampling filter. A fractional input coordinate may be produced from a variety of possible transforms of an output coordinate, such as resizing or cropping an image (e.g., via a simple horizontal and vertical scaling transform), rotating and shearing an image (e.g., via non-separable matrix transforms), perspective warping (e.g., via an additional depth transform) and per-pixel perspective divides applied in piecewise in strips to account for changes in image sensor during image data capture (e.g., due to a rolling shutter), and geometric distortion correction (e.g., via computing a radial distance from the optical center in order to index an interpolated radial gain table, and applying a radial perturbance to a coordinate to account for a radial lens distortion).

Output rescale module 314 may apply transforms to image data as it is processed at output rescale module 314. Output rescale module 314 may include horizontal and vertical scaling components. The vertical portion of the design may implement series of image data line buffers to hold the "support" needed by the vertical filter. As ISP 206 may be a streaming device, it may be that only the lines of image data in a finite-length sliding window of lines are available for the filter to use. Once a line has been discarded to make room for a new incoming line, the line may be unavailable. Output rescale module 314 may statistically monitor computed input Y coordinates over previous lines and use it to compute an optimal set of lines to hold in the vertical support window. For each subsequent line, output rescale module may automatically generate a guess as to the center of the vertical support window. In some embodiments, output rescale module 314 may implement a table of piecewise perspective transforms encoded as digital difference analyzer (DDA) steppers to perform a per-pixel perspective transformation between an input image data and output image data in order to correct artifacts and motion caused by sensor motion during the capture of the image frame. Output rescale may provide image data via output interface 316 to various other components of device 100, as discussed above with regard to FIGS. 1 and 2.

In various embodiments, the functionally of components 302 through 350 may be performed in a different order than the order implied by the order of these functional units in the image processing pipeline illustrated in FIG. 3, or may be performed by different functional components than those illustrated in FIG. 3. Moreover, the various components as described in FIG. 3 may be embodied in various combinations of hardware, firmware or software.

Quadra Image Sensor

Figure 4:
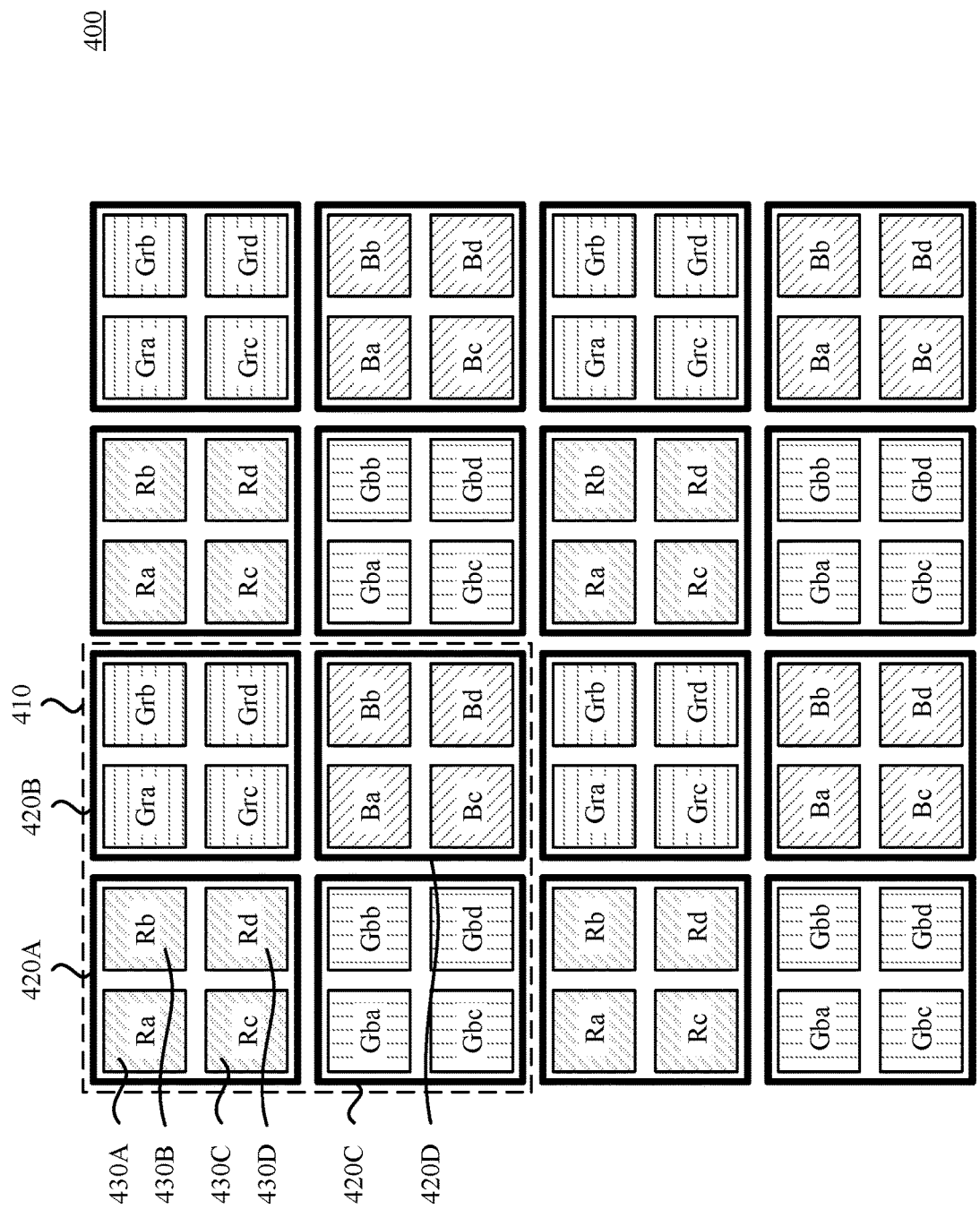
FIG. 4 is a block diagram of a quadra image sensor (also referred to as quad-Bayer image sensor), according to one or more embodiments.

FIG. 4 is a block diagram of a quadra image sensor 400 (also referred to as quad-Bayer image sensor), according to one or more embodiments. The image sensor 400 includes a mosaic of color filters that is configured to filter the light being captured by an array of light sensors. For example, the image sensor 400 may include a first set of color filters that allow red light to pass through (red color filters), a second set of color filters that allow blue light to pass through (blue color filters), and a third set of color filters that allow green light to pass through (green color filters). In some embodiments, the image sensor may include additional or fewer types of color filters.

In a quadra image sensor, each color filter is configured to filter light being captured by multiple light sensors. For example, each color filter is configured to filter light being captured by four light sensors, forming a two-by-two tile.

The example image sensor 400 of FIG. 4 includes a set of pixel blocks 410, each having a set of color filters 420, and a set of light sensors 430 each corresponding to a pixel of an output image. For example, each pixel block 410 includes a red color filter 420A, a first green color filter 420B, a second green color filter 420C, and a blue color filter 420D.

The red color filter 420A is disposed over four light sensors 430. That is, the red color filter 420A overlaps with four light sensors 430. Specifically, the red color filter 420 is disposed over a first light sensor 430A, a second light sensor 430B, a third light sensor 430C, and a fourth light sensor 430D. As such, the first light sensor 430A forms a first red pixel channel Ra, the second light sensor 430B forms a second red pixel channel Rb, the third light sensor 430C forms a third red pixel channel Rc, and the fourth light sensor 430D forms a fourth red pixel channel Rd.

In some embodiments, the second light sensor 430B for the second red pixel channel Rb is next to the first light sensor 430A for the first red pixel channel Ra along a first direction, the third light sensor 430C for the third red pixel channel Rc is next to the first light sensor 430A for the first red pixel channel Ra along a second direction. In some embodiments, the first direction is orthogonal to the second direction. Moreover, in some embodiments, the fourth light sensor 430D for the fourth red pixel channel Rd is arranged at a diagonal from the first light sensor 430A for the first red pixel channel Ra. In some embodiments, the fourth light sensor 430D for the fourth red channel Rd is next to the second light sensor 430B for the second red pixel channel Rb along the second direction, and next to the third light sensor 430C for the third red pixel channel Rc along the first direction.

The first green color filter 420B is disposed over four light sensors 430. That is, the first green color filter 420B overlaps with four light sensors 430. The first light sensor overlapping the first green color filter forms a first green pixel channel Gra, the second light sensor overlapping the first green color filter forms a second green pixel channel Grb, the third light sensor overlapping the first green color filter forms a third green pixel channel Grc, and the fourth light sensor overlapping the first green color filter forms a fourth green pixel channel Grd.

The second green color filter 420C is disposed over four light sensors 430. That is, the second green color filter 420C overlaps with four light sensors 430. The first light sensor overlapping the second green color filter forms a first green pixel channel Gba, the second light sensor overlapping the second green color filter forms a second green pixel channel Gbb, the third light sensor overlapping the second green color filter forms a third green pixel channel Gbc, and the fourth light sensor overlapping the second green color filter forms a fourth green pixel channel Gbd.

The blue color filter 420D is disposed over four light sensors 430. That is, the blue filter 420D overlaps with four light sensors 430. The first light sensor overlapping the blue color filter forms a first blue pixel channel Ba, the second light sensor overlapping the blue color filter forms a second blue pixel channel Bb, the third light sensor overlapping the blue color filter forms a third blue pixel channel Bc, and the fourth light sensor overlapping the blue color filter forms a fourth blue pixel channel Bd.

Example Architecture for Processing Images Captured Using a Quadra Image Sensor

Figure 5:
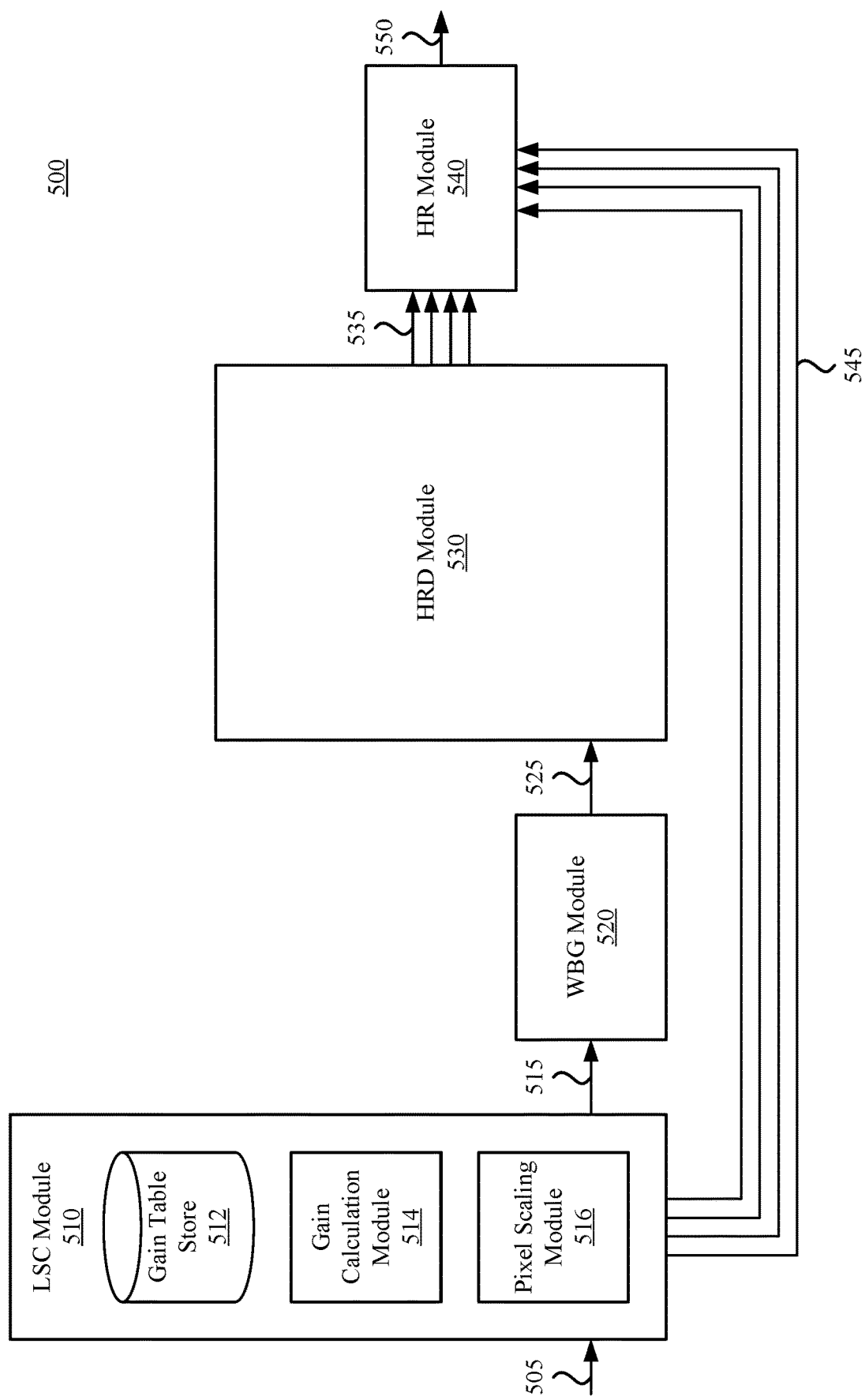
FIG. 5 is a block diagram of a pixel processing circuit, according to one or more embodiments.

FIG. 5 is a block diagram of a pixel processing circuit 500, according to one or more embodiments. The pixel processing circuit 500 may be part of the raw processing stage 306. As mentioned above with reference to FIG. 3, the raw processing stage 306 performs various operations using the raw image data, including pixel correction. In some embodiments, the pixel processing circuit 500 includes a lens shading correction (LSC) module 510, a white balance gain (WBG) module 520, a highlight recovery demosaicing (HRD) module 530, and a highlight recovery (HR) module 540.

The LSC module 510 is a circuit that corrects a vignetting that may be present in an image due to camera settings or lens limitations. Specifically, vignetting is a reduction of an image's brightness or saturation towards the periphery compared to the center of the image. The LSC module 510 applies a gain value to each pixel in the image captured by an image sensor to correct the brightness or saturation of the pixel. In some embodiments, the output of the LSC module 510 is coupled to the input of the WBG module 520. The operation of the LSC module 510 is described below in conjunction with FIG. 7.

In some embodiments, the LSC module 510 receives a stream of pixels 505 corresponding to the pixels of an input image. In some embodiments, the LSC module 510 includes a gain table store 512, a gain calculation module 514, and a pixel scaling module 516. The gain table store 512 is configured to store a set of gain tables for adjusting the pixels from the stream of pixels 505 of the input image. The gain table store 512 may store a gain table for every color channel of an image sensor. For example, for an image sensor using a quadra configuration, the gain table store 512 stores four gain tables for each color supported by the image sensor. A description of the gain tables stored in the gain table store 512 is provided below in conjunction with FIGS. 6A through 6E.

The gain calculation module 514 is a circuit that calculates a gain to be applied to a pixel. The gain calculation module 514 determines the gain based on a set of gain values stored in a gain table corresponding to the color channel of the pixel. Moreover, the gain calculation module 514 determines the gain value based on a position associated with the set of gain values and the position of the pixel. The gain values calculated by the gain calculation module 514 is provided to the pixel scaling module 516. Moreover, in some embodiments, the gain values calculated by the gain calculation module 514 are provided to the HR module 540 as a stream of gain values 545. The operation of the gain calculation module 514 is described below in conjunction with FIG. 8.

The pixel scaling module 516 scales pixels based on the gain value calculated by the gain calculation module 514. In some embodiments, the pixel scaling module 516 multiples a pixel value by the gain calculated by the gain calculation module 514. The Pixel scaling module 516 outputs corrected pixels as a stream of corrected pixels 515.

The WBG module 520 is a circuit that applies white balance gains to the pixels of an image captured by an image sensor. In some embodiments, the WBG module 520 receives the stream of corrected pixels 515 from the LSC module 510 and applies the white balance gains to the values of the pixels received from the LSC module. The WBG module 520 may apply a different gain based on the color or color channel associated with the pixel. For example, the WBG module 520 may calculate a color corrected pixel value Y[c] (where c is the color R, Gr, B, or Gb of the pixel) for a pixel X[c] according to following equation:

$$Y[c]=((X[c]+O1[c])\times G[c]+O2[c]) \quad (1)$$

where O1 is a first offset value, O2 is a second offset value, and G is the white balance gain value for component c. In some embodiments, the output of the WBG module is coupled to the HRD module 530. In some embodiments, the WBG module outputs a stream of pixel values 525 and provides the stream of pixel values 525 to the HRD module 530 for further processing.

The HRD module 530 is a circuit that performs demosaicing for highlight recovery and outputs a stream of demosaiced pixels 535. In some embodiments, the HRD module performs green non-uniformity correction and thumbnail generation, binning compensation, and FIR filter. Each of the functions of the HRD module 530 may be performed on the data received by the HRD module (e.g., pixel stream 525 from the WBG module 520). The output of the HRD module 530 is coupled to the input of the HR module 540. The HRD module may provide demosaiced pixel values to the HR unit without being written back to the line buffers. In some embodiments, the HRD module 530 provides multiple pixel values as an output. Each output pixel value may correspond to a different color. For example, the HRD module 530 may provide a first output corresponding to a red pixel, a second output corresponding to a Gr pixel, a third output corresponding to a blue pixel, and a fourth output corresponding to a Gb pixel.

In some embodiments, to perform demosaicing for a pixel or set of pixels of an image, the HRD module 530 applies a demosaicing algorithm based on a window having a predefined size. For example, the HRD module 530 applies a demosaicing algorithm using pixel values of pixels located within a set distance from the pixel being processed. That is, the HRD module 530 uses pixel values for pixels located within a set number of rows from the pixel being processed and within a set number of columns from the pixel being processed. As such, in some embodiments, the output of the HRD module is delayed by a set number of lines or rows compared to the pixel being processed by the LSC module 510 and the WBG module 520, as well as the stream of gain values 545. In other words, for the HRD module 530 to be able to process a given pixel, the HRD module 530 waits until pixel values for pixels located a set number of lines below the given pixel are processed by the LSC module 510 and the WBG module 520, and are received as an input by the HRD module 530.

The HR module 540 performs highlight recovery for pixels of an image captured by an image sensor and outputs a stream of highlight recovered pixels 550. The HR module 540 may receive a stream of pixels from the HRD module 530 and outputs a stream of highlight recovered pixels. In some embodiments, to perform a highlight recovery algorithm, the HR module 540 applies an inverse LSC gain to the pixels being processed to recover the raw value that was captured by the image sensor. In some embodiments, the HR module 540 receives the LSC gain values (as stream of gain values 545) from the LSC module 510. In some embodiments, the HR module 540 receives an LSC gain value for each color (e.g., one LSC gain value for a red pixel, one LSC gain value for a Gr pixel, one LSC gain value for a blue pixel, and one LSC gain value for a Gb pixel).

In some embodiments, the HR module 540 receives the LSC gain values as the LSC module computes the LSC gain values for processing pixels from correcting the pixels of the image captured by the image sensor. However, since the pixel stream outputted by the HRD module 530 (and received as an input by the HR module 540) is delayed by a set number of lines with respect to the pixels being processed by the LSC module 510, the LSC gain values received by the HR module 540 are ahead by the set number of lines. That is, the LSC gain values received by the HR module 540 from the LSC module 540 (as stream of gain values 545) correspond to pixels located a set number of lines ahead of the pixel being processed by the HR module 540. By using LSC gain values that correspond to locations of a set number of lines ahead of the pixel being processed by the HR module 540, the LSC gain values generated by the LSC module 510 may be applied without adding circuitry to store the LSC gain values to delay the LSC gain values by the set number of lines.

Example Configuration for Performing Lens Shading Correction

Figure 6A:
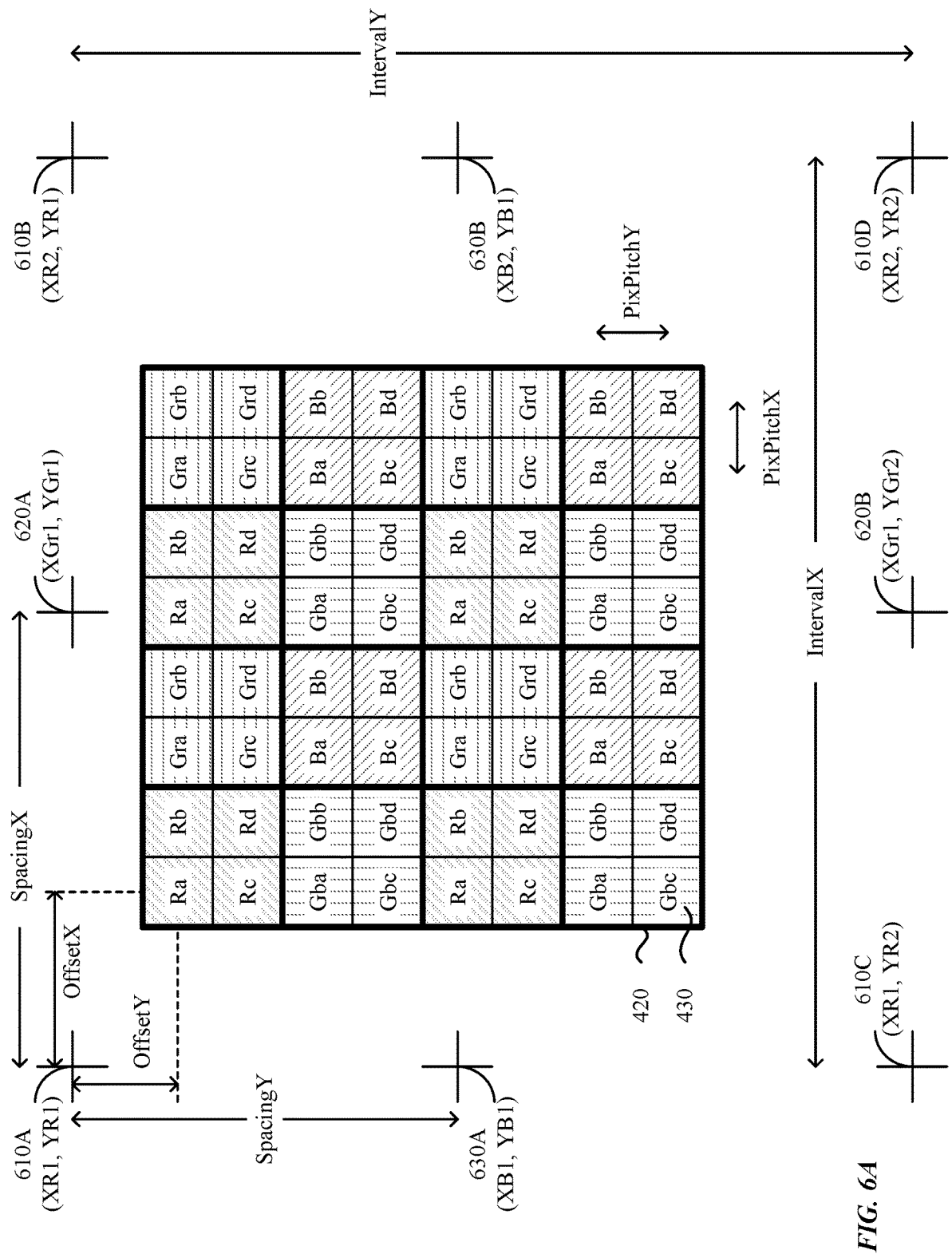
FIG. 6A is a diagram showing an example configuration for performing LSC in a quadra image sensor, according to one or more embodiments.

FIG. 6A is a diagram showing an example configuration for performing LSC in a quadra image sensor, according to one or more embodiments. FIG. 6A shows a grid of LSC gain values for correcting the pixel values of the pixels in the quadra image sensor. The grid includes a set of points, each corresponding to one or more gain values in a LSC gain table. For example, the grid includes a first set of points 610 that correspond to gain values in a first LSC gain table (e.g., a LSC gain table for red pixels), a second set of points 620 that correspond to gain values in a second LSC gain table (e.g., a LSC gain table for green pixels), and a third set of points 630 that correspond to gain values in a third LSC gain table (e.g., a LSC gain table for blue pixels). In some embodiments, separate LSC gain values are used for Gr pixels and Gb pixels. In such embodiments, a separate LSC gain table for Gr pixels and LSC gain table for Gb pixels are stored and the grid includes points that correspond to entries in the LSC gain table for Gr pixels and points that correspond to entries in the LSC gain table for Gb pixels.

In some embodiments, a different LSC gain table is used for each pixel channel. That is, the LSC module 510 may store a LSC gain table for pixels corresponding to the first red pixel channel Ra, a LSC gain table for pixels corresponding to the second red pixel channel Rb, a LSC gain table for pixels corresponding to the third red pixel channel Rc, and a LSC gain table for pixels corresponding to the fourth red pixel channel Rd. Similarly, the LSC module 510 may store a LSC gain table for pixels corresponding to the first blue pixel channel Ba, a LSC gain table for pixels corresponding to the second blue pixel channel Bb, a LSC gain table for pixels corresponding to the third blue pixel channel Bc, a LSC gain table for pixels corresponding to the fourth blue pixel channel Bd, a LSC gain table for pixels corresponding to the first Gr pixel channel Gra, a LSC gain table for pixels corresponding to the second Gr pixel channel Grb, a LSC gain table for pixels corresponding to the third Gr pixel channel Grc, a LSC gain table for pixels corresponding to the fourth Gr pixel channel Grd, a LSC gain table for pixels corresponding to the first Gb pixel channel Gba, a LSC gain table for pixels corresponding to the second Gb pixel channel Gbb, a LSC gain table for pixels corresponding to the third Gb pixel channel Gbc, and a LSC gain table for pixels corresponding to the fourth Gb pixel channel Gbd.

In some embodiments, each point in the grid shown in FIG. 6A corresponds to entries in multiple LSC tables. For example, the first set of points 610 correspond to gain values in the LSC gain table for pixels corresponding to the first red pixel channel Ra, second red pixel channel Rb, third red pixel channel Rc, and fourth red pixel channel Rd. The second set of points 620 correspond to gain values in the LSC gain tables for pixels corresponding to the first Gr pixel channel Gra, second Gr pixel channel Grb, third Gr pixel channel Grc, and fourth Gr pixel channel Grd. The third set of points 630 correspond to gain values in the LSC gain tables for pixels corresponding to the first blue pixel channel Ba, second blue pixel channel Bb, third blue pixel channel Bc, and fourth blue pixel channel Bd. In the embodiments where separate Gr and Gb gain tables are used, a fourth set of points correspond to gain values in the LSC gain tables corresponding to the first Gb pixel channel Gba, second Gb pixel channel Gbb, third Gb pixel channel Gbc, and fourth Gb pixel channel Gbd.

Figure 6B:
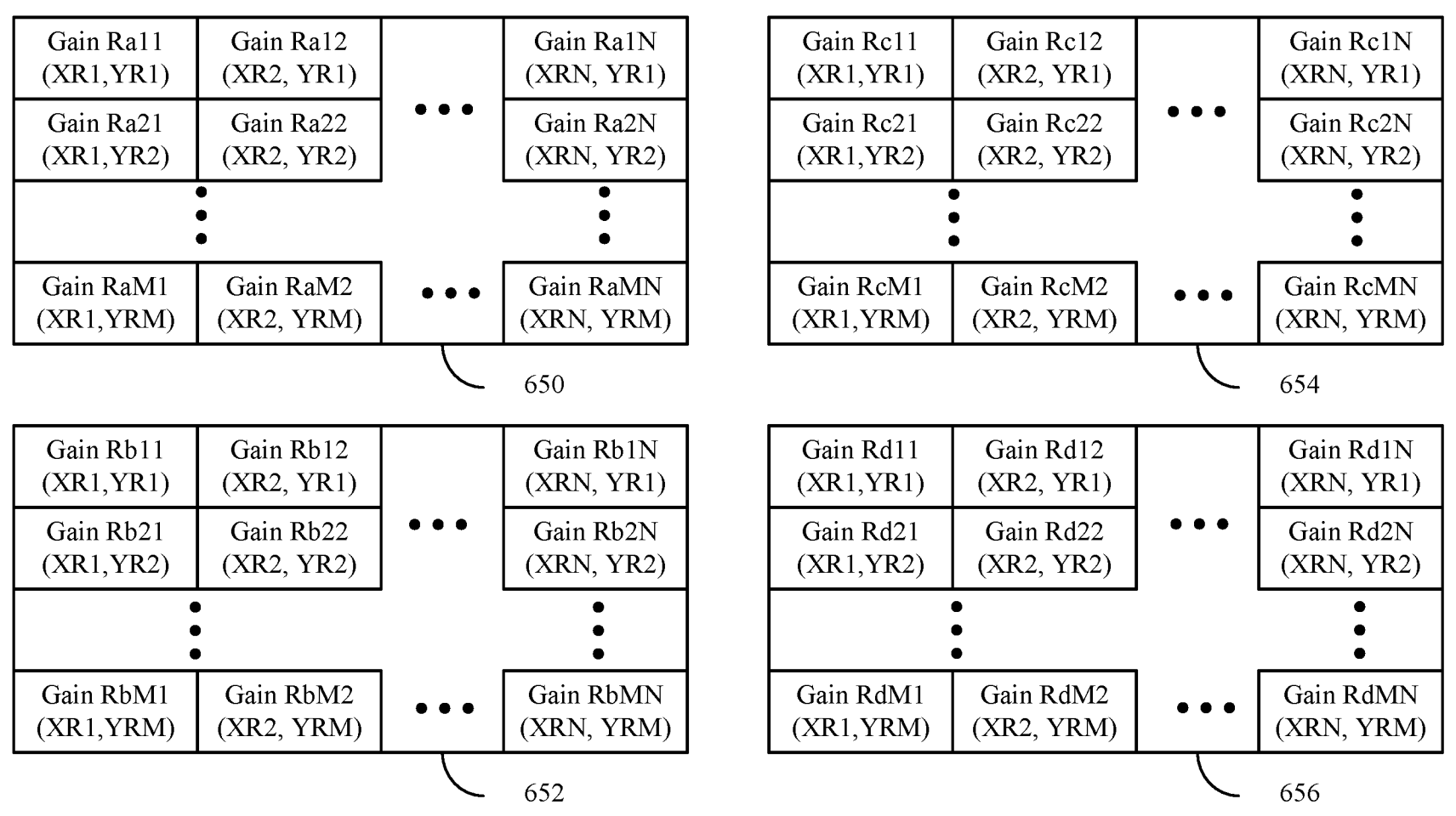
Figure 6C:
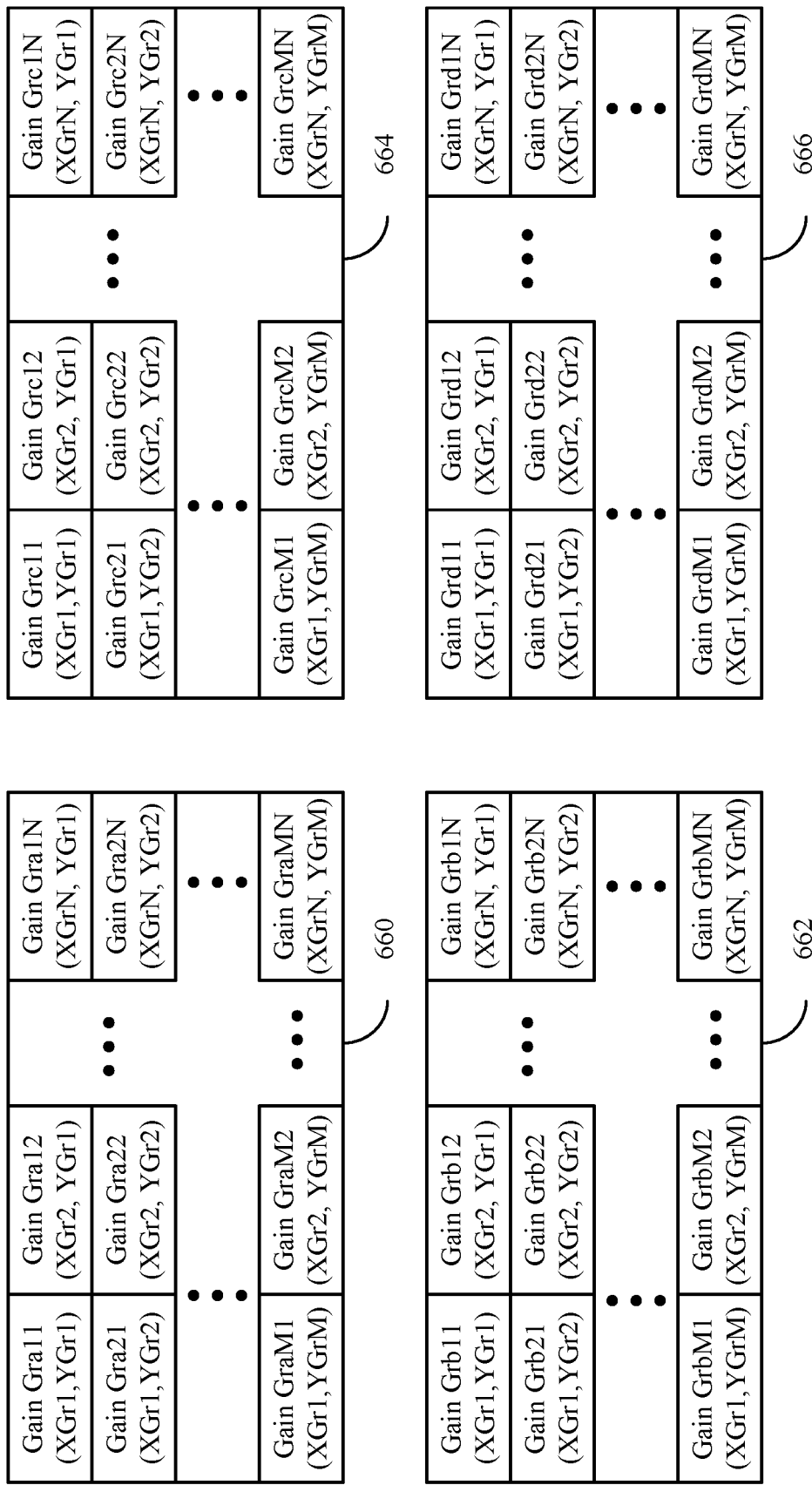
Figure 6D:
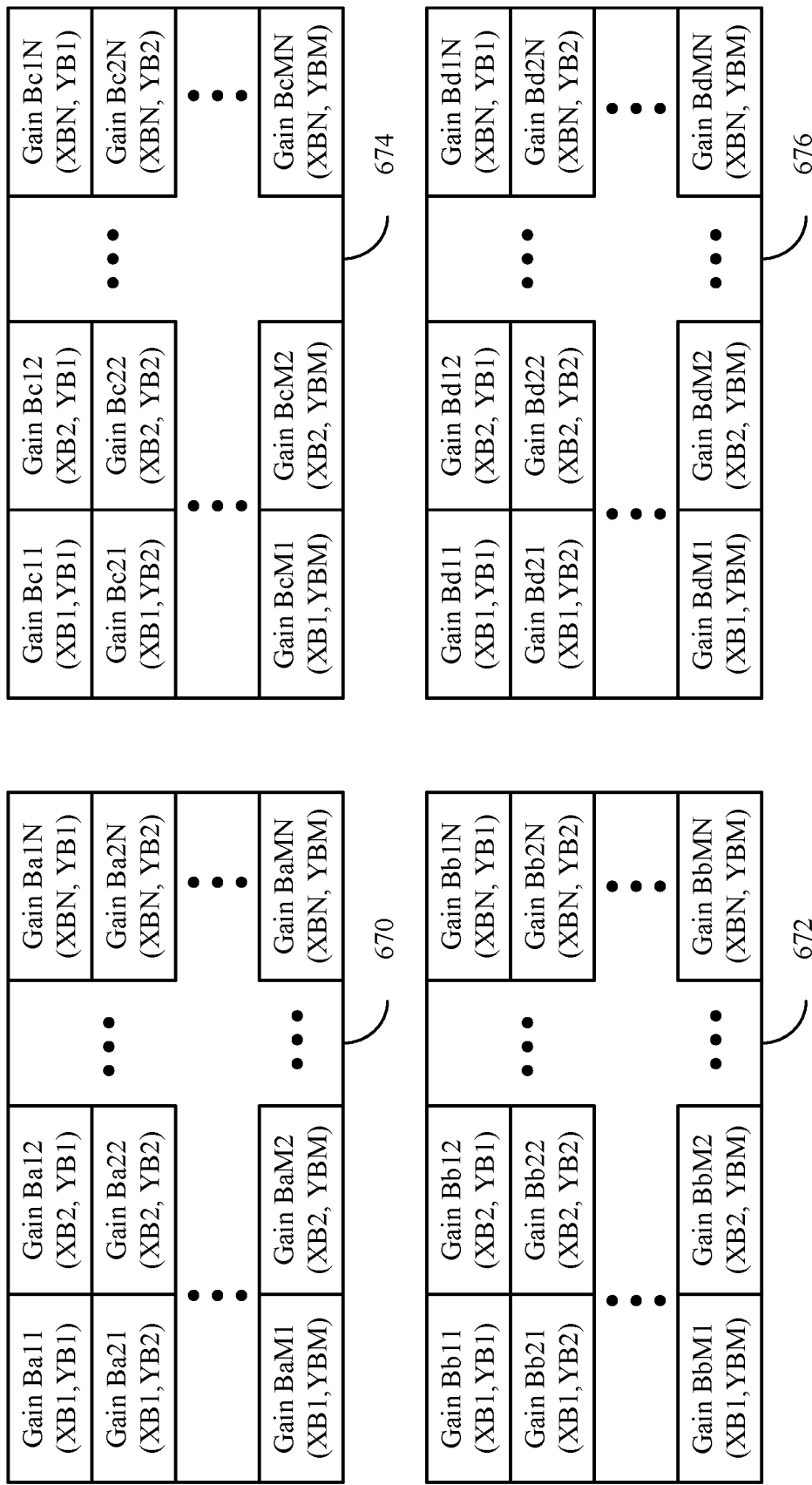

FIGS. 6B through 6E illustrate a set of LSC gain tables for performing LSC in a quadra image sensor, according to one or more embodiments. In particular, FIG. 6B illustrates a set of LSC gain tables for performing LSC in red pixels of a quadra image sensor, FIG. 6C illustrates a set of LSC gain tables for performing LSC in Gr pixels of a quadra image sensor, FIG. 6D illustrates a set of LSC gain tables for performing LSC in blue pixels of a quadra image sensor, FIG. 6E illustrates a set of LSC gain tables for performing LSC in Gb pixels of a quadra image sensor, according to one or more embodiment. Embodiments of the LSC module further stores similar LSC gain tables for other colors.

FIG. 6B shows a first LSC gain table 650 storing LSC gain values for correcting pixels in the first red pixel channel Ra, a second LSC gain table 652 storing LSC gain values for correcting pixels in the second red pixel channel Rb, a third gain table 654 storing LSC gain values for correcting pixels in the third red pixel channel Rc, and a fourth gain table 656 storing LSC gain values for correcting pixels in the fourth red pixel channel Rd.

The first LSC gain table 650 corresponding to the first red pixel channel Ra includes a set of LSC gain values Ra11 through RaMN. A first LSC gain value Ra11 is associated with a first point 610A of the first set of points 610, a second LSC gain value Ra12 is associated with a second point 610B of the first set of points 610, and so forth. That is, the first LSC gain value Ra11 corresponds to a location (XR1, YR1) corresponding to the first point 610A of the first set of points, the second LSC gain value Ra12 corresponds to a location (XR2, YR1) corresponding to the second point 610B of the first set of points 610.

In some embodiments, the LSC gain values are stored in a matrix. As such, the LSC gain values in a first column of the LSC gain table 650 correspond to points of the first set of points 610 having a first horizontal coordinate XR1, gain values in a second column of the LSC gain table 650 correspond to points of the first set of points 610 having a second horizontal coordinate XR2, and so forth. An N-th column of the LSC gain table 650 corresponds to points of the first set of points 610 having an N-th horizontal coordinate XRN.

Similarly, the LSC gain values in a first row of the LSC gain table 650 correspond to points of the first set of points 610 having a first vertical coordinate YR1, gain values in a second row of the LSC gain table 650 correspond to points of the first set of points 610 having a second vertical coordinate YR2, and so forth. An M-th row of the LSC gain table 650 corresponds to points of the first set of points 610 having an M-th vertical coordinate YRM.

Moreover, the second gain table 652 corresponding to the second red pixel channel Rb includes a set of LSC gain values Rb11 through RbMN, the third gain table 654 corresponding to the third red pixel channel Rc includes a set of LSC gain values Rc11 through RcMN, and the fourth gain table 656 corresponding to the fourth red pixel channel Rd includes a set of LSC gain values Rd11 through RdMN.

A first LSC gain value Rb11 of the second LSC gain table 652 is associated with the first point 610A of the first set of points 610. That is, the first LSC gain value Ra11 of the first LSC gain table 650 and the first LSC gain value Rb11 of the second LSC gain table 652 are associated with the same point having a coordinate of (XR1, YR1). Similarly, a first LSC gain value Rc11 of the third LSC gain table 654 and a first LSC gain value Rd11 of the fourth LSC gain table 656 are also associated with the first point 610A of the first set of points 610.

Similarly, a second LSC gain value Rb12 of the second LSC gain table 652 is associated with the second point 610B of the first set of points 610. That is, the second LSC gain value Ra12 of the first LSC gain table 650 and the second LSC gain value Rb12 of the second LSC gain table 652 are associated with the same point having a coordinate of (XR2, YR1). Similarly, a second LSC gain value Rc12 of the third LSC gain table 654 and a second LSC gain value Rd12 of the fourth LSC gain table 656 are also associated with the second point 610B of the first set of points 610.

In some embodiments, each point of the first set of points 610 is associated with a LSC gain value from each of the first to fourth LSC tables shown in FIG. 6B. That is, each point of the first set of points 610 is associated with a LSC gain value from the first LSC gain table 650 corresponding to the first red pixel channel Ra, a LSC gain value from the second LSC gain table 652 corresponding to the second red pixel channel Rb, a LSC gain value from the third LSC gain table 654 corresponding to the third red pixel channel Rc, and a LSC gain value from the fourth LSC gain table 656 corresponding to the fourth red pixel channel Rd.

FIG. 6C shows a first LSC gain table 660 storing LSC gain values for correcting pixels in the first Gr pixel channel Gra, a second LSC gain table 662 storing LSC gain values for correcting pixels in the second Gr pixel channel Grb, a third gain table 664 storing LSC gain values for correcting pixels in the third Gr pixel channel Grc, and a fourth gain table 666 storing LSC gain values for correcting pixels in the fourth Gr pixel channel Grd.

A first point 620A (having a coordinate of (XGr1,YGr1)) of the second set of points 620 is associated with a first LSC gain value Gra11 of the first LSC gain table 660, a first gain value Grb11 of the second LSC gain table 662, a first gain value Grc11 of the third LSC gain table 664, and a first LSC gain value Grd11 of the fourth LSC gain table 666. Similarly, a second point 620B (having a coordinate of XGr2, YGr1)) of the second set of points 620 is associated with a second LSC gain value Gra12 of the first LSC gain table 660, a second gain value Grb12 of the second LSC gain table 662, a second gain value Grc12 of the third LSC gain table 664, and a second LSC gain value Grd12 of the fourth LSC gain table 666.

Similarly, FIG. 6D shows a first LSC gain table 670 storing LSC gain values for correcting pixels in the first blue pixel channel Ba, a second LSC gain table 672 storing LSC gain values for correcting pixels in the second blue pixel channel Bb, a third gain table 674 storing LSC gain values for correcting pixels in the third blue pixel channel Bc, and a fourth gain table 676 storing LSC gain values for correcting pixels in the fourth blue pixel channel Bd. Moreover, FIG. 6E shows a first LSC gain table 680 storing LSC gain values for correcting pixels in the first Gb pixel channel Gba, a second LSC gain table 682 storing LSC gain values for correcting pixels in the second Gb pixel channel Gbb, a third gain table 684 storing LSC gain values for correcting pixels in the third Gb pixel channel Gbc, and a fourth gain table 686 storing LSC gain values for correcting pixels in the fourth Gb pixel channel Gbd.

Referring back to FIG. 6A, in some embodiments, points of the first set of points 610 are adjacent to points of the second set of points 620 in a first direction (e.g., a horizontal direction), and adjacent to points of the third set of points 630 in a second direction (e.g., a vertical direction). For example, a point 610 corresponding to an LSC gain value for red pixels may have points 620 corresponding to LSC gain values for Gr pixels disposed on the left and right side of the point 610, and points 630 corresponding to LSC gain values for blue (B) pixels disposed above and below the point 610.

Points of the second set of points 620 are adjacent to points of the first set of points 610 in the first direction. Additionally, in some embodiments, points of the second set of points 620 are adjacent to points of a fourth set of points in the second direction. Similarly, points of the third set of points 630 are adjacent to points of the first set of points 610 in the second direction, and optionally, adjacent to points of the fourth set of points in the first direction.

In some embodiments, the points (such as a point from the first set of points 610, the second set of points 620, or the third set of points 630) in the grid shown in FIG. 6A are separated by a set spacing value. For example, points in the grid are separated by a distance SpacingX in the first direction, and a distance SpacingY in the second direction. In some embodiments, the distance SpacingX is the distance between a first point 610A (at coordinate XR1, YR1) from the first set of points 610 to a first point 620A (at coordinate XGr1,YGr1) from the second set of points 620 along the first direction. That is, the distance SpacingX may be equivalent to SpancingX=XGr1−XR1. Similarly, the distance SpacingY is the distance between a first point 610A (at coordinate XR1, YR1) from the first set of points 610 to a first point 630A (at coordinate XB1,YB1) from the third set of points 630 along the second direction. That is, the distance SpacingY may be equivalent to SpancingY=YB1−YR1.

In some embodiments, points from a same set of points (i.e., points corresponding to a same color) are separated by a distance IntervalX in the first direction, and a distance IntervalY in the second direction. That is, the distance IntervalX may be the distance between a first point 610A (at coordinate XR1, YR1) from the first set of points 610 to a second point 610B (at coordinate XR2,YR1) from the first set of points 610 along the first direction. That is, the distance IntervalX may be equivalent to IntervalX=XR2−XR1. In some embodiments, the distance IntervalX is a multiple of the distance SpacingX. For example, IntervalX may be twice SpacingX. In other embodiments, SpacingX and IntervalX are independent of each other. For example, a first red pixel and a first Gr pixel may be separated by a first distance (e.g., SpacingX), and the first Gr pixel may be separated from a second red pixel by a second distance (e.g., IntervalX−SpacingX), where the second distance is different than the first distance.

Similarly, the distance IntervalY may be the distance between a first point 610A (at coordinate XR1, YR1) from the first set of points 610 to a third point 610C (at coordinate XR1,YR2) from the first set of points 610 along the second direction. That is, the distance IntervalY may be equivalent to IntervalY=YR2−YR1. In some embodiments, the distance IntervalY is a multiple of the distance SpacingY. For example, IntervalY may be twice SpacingY. In other embodiments, SpacingY and IntervalY are independent of each other. For example, a first red pixel and a first Gb pixel may be separated by a first distance (e.g., SpacingY), and the first Gb pixel may be separated from a second red pixel by a second distance (e.g., IntervalY−SpacingY), where the second distance is different than the first distance.

In some embodiments, the LSC module 510 may determine the position of each of the points in the grid based on a distance from a predetermined point. For example, the LSC module 510 determines a position of a point in the grid based on the first point 610A of the first set of points 610. The LSC module 510 determines a horizontal distance and a vertical distance from the predetermined point. In some embodiments, the predetermined point is an origin point and is assigned a coordinate of (0,0). As such, the coordinate or position of each point in the grid can be calculated based on the index of the point (e.g., point column number and point row number), SpacingX, and SpacingY. For example, for a point in the i-th column and the j-th row, the coordinate or position of the point may be calculated according to the following equation:

$$(i \times \text{SpacingX}, j \times \text{SpacingY}) \quad (2)$$

In this embodiment, points corresponding to different sets of points may share the same indexing scheme. For example, the first point 610A of the first set of points 610 may be assigned a first index (e.g., i=0), the first point 620A of the second set of points 620 may be assigned a second index (e.g., i=1), the second point 610B of the first set of points 610 may be assigned a third index (e.g., i=2), and so forth.

Alternatively, each set of points may be assigned to a different indexing scheme. That is, the first set of points 610 may have a first indexing scheme, the second set of points may have a second indexing scheme, and so forth. In this embodiment, the first point 610A of the first set of points 610 and the second point 620A of the second set of points may be assigned a first index (e.g., i=0), the second point 610B of the first set of points 610 and the second point of the second set of points 620 may be assigned a second index (e.g., i=1), and so forth.

In some embodiments, the coordinate or position of the point is calculated based on the color associated with the point. For example, the coordinate or position for points corresponding to a first color (e.g., red) may be calculated as (2i×SpacingX, 2j×SpacingY). Moreover, the coordinate or position for points corresponding to a second color (e.g., Gr) may be calculated as ((2i+1)×SpacingX, 2j×SpacingY), the coordinate or position for points corresponding to a third color (e.g., blue) may be calculated as (2i×SpacingX, (2j+1)×SpacingY), and the coordinate or position for points corresponding to a fourth color (e.g., Gb) may be calculated as ((2i+1)×SpacingX, (2j+1)×SpacingY).

In other embodiments, the coordinate or position of the point is calculated based on the distance SpacingX and the distance IntervalX in the first direction, and the distance SpacingY and the distance IntervalY in the second direction. For example, the coordinate or position for points corresponding to a first color (e.g., red) may be calculated as (i×IntervalX, j×IntervalY). Moreover, the coordinate or position for points corresponding to a second color (e.g., Gr) may be calculated as (SpacingX+i×IntervalX, j×IntervalY), the coordinate or position for points corresponding to a third color (e.g., blue) may be calculated as (i×IntervalX, SpacingY+j×IntervalY), and the coordinate or position for points corresponding to a fourth color (e.g., Gb) may be calculated as (SpacingX+i×IntervalX, SpacingY+j×IntervalY).

In some embodiments, the light sensors 430 of the image sensor 400 are separated by a set spacing of pitch. For example, the light sensors 430 are separated by a distance of PixPitchX in the first direction and a distance of PixPitchY in the second direction. Additionally, a first light sensor of the image sensor 400 is disposed a set offset from the first point 610A (e.g., the origin point) of the grid shown in FIG. 6A. For example, the first light sensor of the image sensor is positioned a distance OffsetX in the first direction and a distance OffsetY in the second direction from the first point 610A of the grid. As such, a coordinate or position of each pixel can be calculated based on a pixel index (e.g., pixel column number and pixel row number), PixPitchX, PixPitchY, OffsetX and OffsetY. For example, for a light sensor in the i-th column and the j-th row, the coordinate or position of the point may be calculated according to the following equation:

$$(\text{OffsetX}+i\times\text{PixPitchX}, \text{OffsetY}+j\times\text{PixPitchY}) \quad (3)$$

Example Process for Performing Lens Shading Correction

Figure 7:
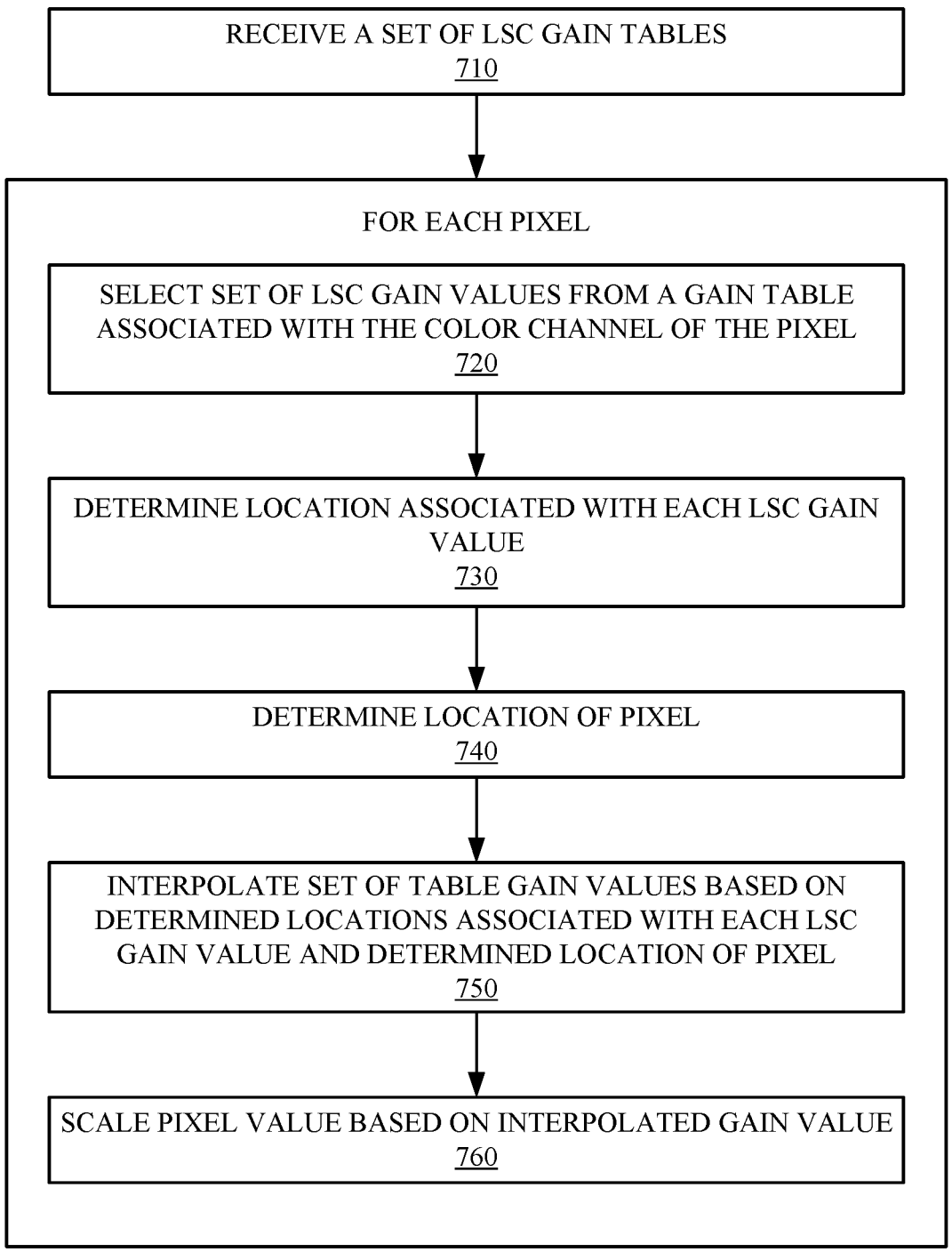
FIG. 7 is a flowchart illustrating a method for performing LSC in a quadra image sensor, according to one or more embodiments.

FIG. 7 is a flowchart illustrating a method for performing LSC in a quadra image sensor, according to one or more embodiments. The method may include additional or fewer steps, and steps may be performed in different orders or be performed in parallel. The method may be performed by the LSC module 510 of FIG. 5.

In some embodiments, the LSC module 510 receives 710 a set of LSC gain tables. The set of LSC gain tables may be provided to the LSC module 510 during a set up stage or during manufacturing of the LSC module. The LSC module 510 may receive one or more LSC gain table for each color used in the image sensor. For example, the LSC module 510 may receive one LSC gain table for each channel of each color used in the image sensor. That is, in a quadra image sensor that includes four separate channels for each color, the LSC module 510 receives four separate tables for each color used in the sensor. As such, if the image sensor has four colors (R, Gr, B, and Gb), the LSC module 510 receives 16 separate LSC gain tables. In some embodiments, the LSC gain tables are stored in a memory of the LSC module 510. The LSC module 510 may then access the stored tables when performing LSC on pixels of an image captured by the image sensor.

The LSC gain tables include a set of LSC gain values for performing LSC of pixels of an image captured by the image sensor. The LSC gain values of an LSC gain table may be arranged in columns and rows (e.g., as a two-dimensional array). Each LSC gain value may have an index specifying the column number and row number associated with the LSC gain value within the LSC gain table.

Each LSC gain value of each LSC gain table is associated with a location. In some embodiment, the LSC gain values for LSC gain tables corresponding to different channels of the same color are co-located. That is, the LSC gain values for the LSC gain tables for the Ra are co-located with the LSC gain values for the LSC gain table for the Rb, Rc, and Rd channels. Similarly, the LSC gain values for the LSC gain tables for the Gra, Grb, Grc and Grd channels are co-located, the LSC gain values for the LSC gain tables for the Ba, Bb, Bc and Bd channels are co-located, and the LSC gain values for the LSC gain tables for the Gba, Gbb, Gbc and Gbd channels are co-located. In other words, the first LSC gain value of the LSC gain table for the Ra channel, the first LSC gain value of the LSC gain table for the Rb channel, the first LSC gain value of the LSC gain table for the Rc channel, and the first LSC gain value for the LSC gain table for the Rd channel are associated with the same first location. Moreover, the second LSC gain value of the LSC gain table for the Ra channel, the second LSC gain value of the LSC gain table for the Rb channel, the second LSC gain value of the LSC gain table for the Rc channel, and the second LSC gain value for the LSC gain table for the Rd channel are associated with the same second location, and so forth.

In some embodiments, the locations associated with the LSC gain values for LSC gain tables corresponding to a second color (e.g., LSC gain tables corresponding to Gr channels) have a set offset in a first direction (e.g., SpacingX) with respect to the LSC gain values for LSC gain tables corresponding to a first color (e.g., LSC gain tables corresponding to red channels). Moreover, the locations associated with the LSC gain values for LSC gain tables corresponding to a third color (e.g., LSC gain tables corresponding to blue channels) have a set offset in a second direction (e.g., SpacingY) with respect to the LSC gain values for LSC gain tables corresponding to the first color. Additionally, the LSC gain values for LSC gain tables corresponding to a fourth color (e.g., LSC gain tables corresponding to Gb channels) have a set offset in the first direction and a set offset in the second direction with respect to the LSC gain values for the LSC gain tables corresponding to the first color.

Referring back to FIG. 7, for each pixel of an image captured by the image sensor, the LSC module 510 selects 720 a set of LSC gain values from a LSC gain table associated with the color channel of the pixel. For example, the LSC module 510 may select an LSC gain table based on the color channel (e.g., Ra, Rb, Rc, Rd, Gra, Grb, Grc, Grd, Ba, Bb, Bc, Bd, Gba, Gbb, Gbc, or Gbd), and identifies a set of LSC gain values from the selected table. In some embodiments, the set of LSC gain values are selected based on the position of the pixel. Alternatively, the set of LSC gain values are selected based on an index (e.g., column number and row number) of the pixel.

In some embodiments, the LSC module 510 selects four LSC gain values from the selected LSC gain table. The LSC module 510 may select a first LSC gain value from the selected LSC gain table, and select additional three LSC gain values based on the selected first LSC gain value. For example, the LSC module 510 selects a second LSC gain value from the selected LSC gain table by incrementing a column number of the first LSC gain value by 1, a third LSC gain value by incrementing a row number of the first LSC gain value by 1, and a fourth LSC gain value by incrementing both the column number and the row number of the first LSC gain value by 1.

The LSC module 510 determines 730 a location associated with each of the LSC gain values. As explained above, the LSC module 510 may determine the location associated with each LSC gain value based on the index of the LSC gain value (e.g., column number and row number in the LSC gain table corresponding to the LSC gain value), a horizontal spacing distance SpacingX, and a vertical spacing distance SpacingY. In some embodiments, the LSC module 510 determines the location associated with the first LSC gain value, and the location associated with the remaining LSC gain values can be determined based on the location associated with the first LSC gain value.

The LSC module 510 determines 740 a location of the pixel. As explained above, the LSC module 510 may determine the location of the pixel based on the index of the pixel (e.g., column number and row number of the pixel within the image sensor), a horizontal offset OffsetX, a vertical offset OffsetY, a horizontal pitch PixPitchX, and a vertical pitch PixPitchY.

Based on the determined locations associated with each LSC gain value and the determined location of the pixel, the LSC module 510 interpolates 750 the selected LSC gain values. In some embodiments, the LSC module interpolates a first selected LSC gain value and a second selected LSC gain value in a first direction to generate a first interpolated LSC gain value, and interpolated a third selected LSC gain value and a fourth selected LSC gain value in the first direction to generate a second interpolated LSC gain value. Moreover, the LSC module 510 interpolates the first interpolated LSC gain value and the second interpolated LSC gain value in a second direction to generate a pixel LSC gain value. The process for interpolating LSC gain values is described in more detail herein below in conjunction with FIG. 8.

The LSC module 510 scales 760 the pixel based on the pixel LSC gain value determined by interpolating the selected LSC gain values. For example, the LSC module 510 multiples the pixel value by the determined pixel LSC gain value to generate a corrected pixel value and stores the corrected pixel value back into the image.

Figure 8:
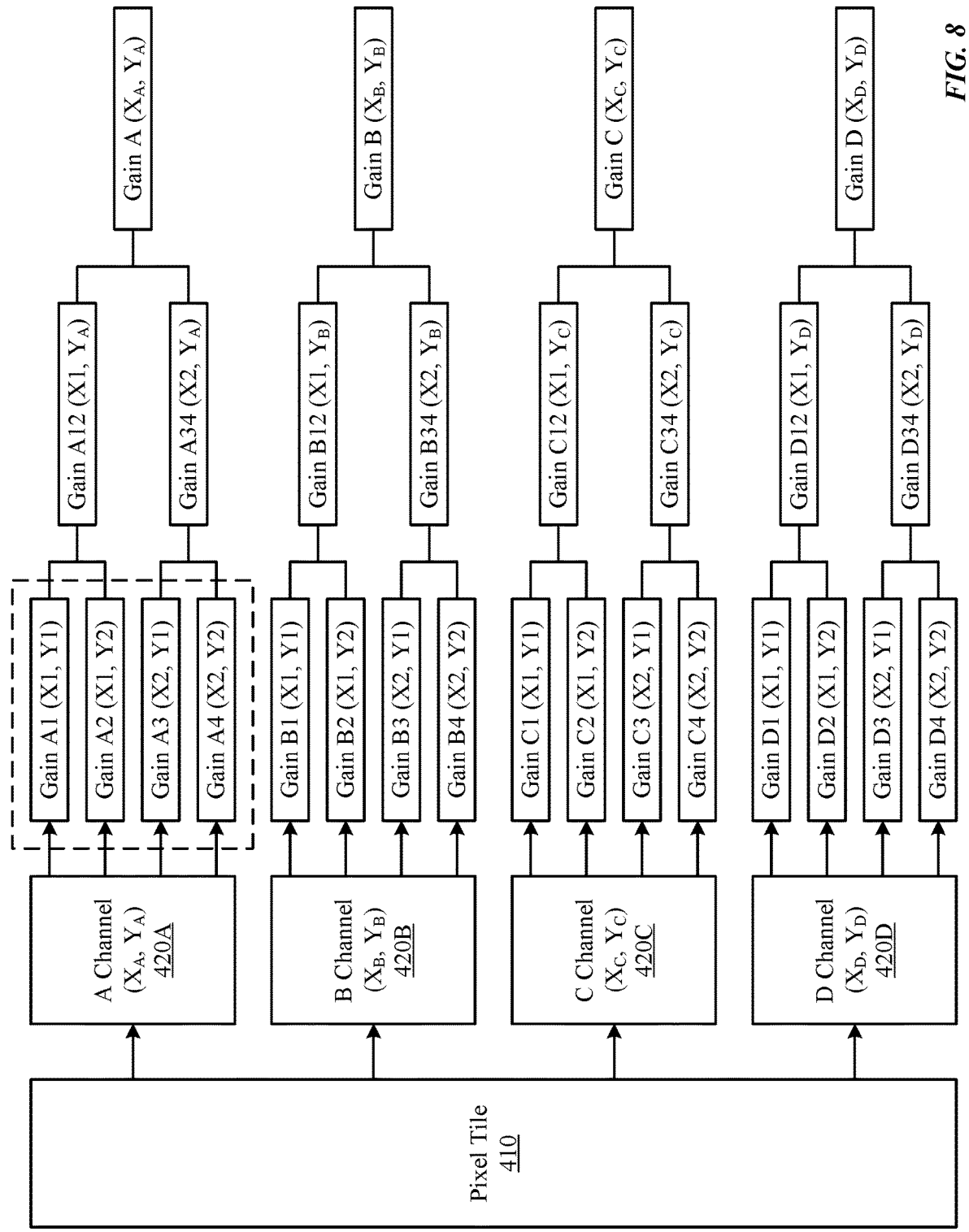
FIG. 8 is a flowchart illustrating a process for interpolating LSC gain values for pixels in a pixel tile, according to one embodiment.

FIG. 8 is a flowchart illustrating a process for interpolating LSC gain values for pixels in a pixel tile, according to one embodiment. The pixel tile 410 includes four pixels, each corresponding to a different channel of the same color. Specifically, the pixel tile 410 includes a first pixel 420A corresponding to a first channel (A channel), a second pixel 420B corresponding to a second channel (B channel), a third pixel 420C corresponding to a third channel (C channel), and a fourth pixel 420D corresponding to a fourth channel.

The first pixel 420A has a location of (XA, YA), the second pixel 420B has a location of (XB, YB), the third pixel 420C has a location of (Xc, Yc), and the fourth pixel 420D has a location of (XD, YD). Moreover, the LSC module 510 identifies LSC gain values A1, A2, A3 and A4 for correcting the first pixel 420A, LSC gain values B1, B2, B3 and B4 for correcting the second pixel 420B, gain values C1, C2, C3 and C4 for correcting the third pixel 420C, and gain values D1, D2, D3 and D4 for correcting the fourth pixel 420D. Since the first pixel 420A, the second pixel 420B, the third pixel 420C, and the fourth pixel 420D correspond to different channels of the same color, the LSC gain values for correcting the first pixel 420A, the second pixel 420B, the third pixel 420C, and the fourth pixel 420D are co-located. That is, the gain values A1, B1, C1 and D1 are associated with the same first location (X1, Y1), the gain values A2, B2, C2 and D2 are associated with the same second location (X2, Y1), the gain values A3, B3, C3 and D3 are associated with the same third location (X1, Y2), and the gain values A4, B4, C4 and D4 are associated with the same fourth location (X2, Y2).

To generate the pixel LSC gain value for correct the first pixel 420A, the LSC module 510 interpolates the gain values A1 and A2 in the vertical direction based on the vertical position Y1 of the gain value A1, the vertical position Y2 of the gain value A2 and the vertical position YA of the first pixel 420A to generate the first interpolated LSC gain value A12, and interpolates the gain values A3 and A4 in the vertical direction based on the vertical position Y1 of the gain value A3, the vertical position Y2 of the gain value A4 and the vertical position YA of the first pixel 420A to generate the second interpolated LSC gain value A34. Then, the LSC module 510 interpolates the first interpolated LSC gain value A12 and the second interpolated LSC gain value A34 in the horizontal direction based on the horizontal position X1 of the first interpolated LSC gain value A12 (i.e., the horizontal position of the gain values A1 and A2), the horizontal position X2 of the second interpolated LSC gain value A34 (i.e., the horizontal position of the gain values A3 and A4), and the horizontal position XA of the first pixel 420A to generate the pixel LSC gain value A.

Similarly, to generate the pixel LSC gain value for correct the second pixel 420B, the LSC module 510 interpolates the gain values B1 and B2 in the vertical direction based on the vertical position Y1 of the gain value B1, the vertical position Y2 of the gain value B2 and the vertical position YB of the second pixel 420B to generate the first interpolated LSC gain value B12, and interpolates the gain values B3 and B4 in the vertical direction based on the vertical position Y1 of the gain value B3, the vertical position Y2 of the gain value B4 and the vertical position YB of the second pixel 420B to generate the second interpolated LSC gain value B34. Then, the LSC module 510 interpolates the first interpolated LSC gain value B12 and the second interpolated LSC gain value B34 in the horizontal direction based on the horizontal position X1 of the first interpolated LSC gain value B12 (i.e., the horizontal position of the gain values B1 and B2), the horizontal position X2 of the second interpolated LSC gain value B34 (i.e., the horizontal position of the gain values B3 and B4), and the horizontal position XB of the second pixel 420B to generate the pixel LSC gain value B. This process is repeated for third pixel 420C and the fourth pixel 420D.

In some embodiments, the LSC gain values are generated by interpolating a first and second gain values in the horizontal direction to generate a first interpolated LSC gain value, and a third and fourth gain values in the horizontal direction to generate a second interpolated LSC gain value. The first interpolated LSC gain value and the second interpolated LSC gain value are then interpolated in the vertical direction to generate the pixel LSC gain value.

While the embodiments herein are described with respect to processing of an image captured using a quadra sensor (i.e., having 2-by-2 pixel tiles of the same color), the principles described herein can be applied to image sensors having other pixel tile configurations (e.g., 3-by-3 or 4-by-4 pixel tiles). Moreover, throughout the specification, Gr pixels (green pixels located in the same row as red pixels) and Gb pixels (green pixels located in the same row as blue pixels) are treated as being of different colors. That is, Gr and Gb are considered to be different colors. However, the described embodiments are not limited thereto and the principles described herein can be applied to a configurated where Gr and Gb pixels are considered to be of the same color.

While particular embodiments and applications have been illustrated and described, it is to be understood that the invention is not limited to the precise construction and components disclosed herein and that various modifications, changes and variations which will be apparent to those skilled in the art may be made in the arrangement, operation and details of the method and apparatus disclosed herein without departing from the spirit and scope of the present disclosure.

What is claimed is:

1. A method for processing pixels of an image captured by an image sensor, comprising:

receiving a version of the image captured by the image sensor, the image sensor having a plurality of pixel tiles, each pixel tile including a plurality of pixels corresponding to a same color;

for each color of a plurality of colors, receiving a set of gain tables, each gain table corresponding to a different channel associated with the color, each gain table including a set of gain values, each gain value associated with a location; and determining, for each pixel in a pixel tile, a pixel gain value from the set of gain tables corresponding to a color of the pixel tile by at least:

identifying, based on the location of a first pixel of the pixel tile, a first plurality of gain values from a first gain table of the set of gain tables corresponding to the color of the pixel tile, wherein the first plurality of gain values includes a first gain value associated with a first location within the image sensor and a second gain value associated with a second location within the image sensor, and determining a first pixel gain value for the first pixel of the pixel tile by interpolating the first plurality of gain values; and scaling each pixel in the pixel tile based on the determined pixel gain values.

2. The method of claim 1, wherein the gain values of gain tables corresponding to a same color are associated with a same set of locations.

3. The method of claim 1, wherein the gain values of gain tables corresponding to different colors are associated with a different set of locations.

4. The method of claim 3, wherein the locations of the gain values of gain tables corresponding to a second color are offset from the locations of the gain values of gain tables corresponding to a first color by a first distance in a first direction, and wherein the locations of gain values of gain tables corresponding to a third color are offset from the locations of the gain values of gain tables corresponding to the first color by a second distance in a second direction.

5. The method of claim 1, wherein the pixel gain value from the set of gain tables corresponding to the color of the pixel tile is determined further by:

determining a color channel corresponding to the first pixel; and identifying the first gain table based on the color channel corresponding to the first pixel.

6. The method of claim 1, wherein the pixel gain value from the set of gain tables corresponding to the color of the pixel tile us determined further by:

identifying, based on the location of a second pixel of the pixel tile, a second plurality of gain values from a second gain table of the set of gain tables corresponding to the color of the pixel tile, wherein the second plurality of gain values includes a third gain value associated with the first location within the image sensor and a fourth gain value associated with the second location within the image sensor, determining a second pixel gain value for the second pixel of the pixel tile by interpolating the second plurality of gain values, and scaling the second pixel by the determined second pixel gain.

7. The method of claim 1, wherein the first plurality of gain values further includes a third gain value associated with a third location within the image sensor, and a fourth gain value associated with a fourth location within the image sensor, and wherein determining the first pixel gain value comprises:

generating a first interpolated gain value by interpolating the first gain value and the second gain value in a first direction based on a horizontal position of the first gain value, a horizontal position of the second gain value, and a horizontal position of the pixel, generating a second interpolated gain value by interpolating the third gain value and the fourth gain value in the first direction based on a horizontal position of the third gain value, a horizontal position of the fourth gain value, and the horizontal position of the pixel, and generating the pixel gain value by interpolating the first interpolated gain value and the second interpolated gain value based on a vertical position of the first gain value, a vertical position of the third gain value, and a vertical position of the pixel.

8. The method of claim 1, further comprising:

sending the determined pixel gain values to a highlight recovery module, wherein the pixel gain values correspond to pixels that are ahead from pixels being processed by the highlight recovery module by a set number of lines.

9. The method of claim 8, wherein the highlight recovery module receives one pixel value corresponding to each color of the plurality of colors supported by the image sensor from a demosaicing module, and one pixel gain value for each color of the plurality of colors supported by the image sensor for processing each of the received pixel values.

10. A lens shading correction (LSC) circuit configured to:

receive a version of an image captured by an image sensor, the image sensor having a plurality of pixel tiles, each pixel tile including a plurality of pixels corresponding to a same color;

for each color of a plurality of colors, receive a set of gain tables, each gain table corresponding to a different channel associated with the color, each gain table including a set of gain values, each gain value associated with a location;

determine, for each pixel in a pixel tile, a pixel gain value from the set of gain tables corresponding to a color of the pixel tile comprising:

identifying, based on the location of a first pixel of the pixel tile, a first plurality of gain values from a first gain table of the set of gain tables corresponding to the color of the pixel tile, wherein the first plurality of gain values includes a first gain value associated with a first location within a image sensor and a second gain value associated with a second location within the image sensor, and determining a first pixel gain value for the first pixel of the pixel tile by interpolating the first plurality of gain values; and scale each pixel in the pixel tile based on the determined pixel gain values.

11. The LSC circuit of claim 10, wherein the gain values of gain tables corresponding to a same color are associated with a same set of locations.

12. The LSC circuit of claim 10, wherein the gain values of gain tables corresponding to different colors are associated with a different set of locations.

13. The LSC circuit of claim 12, wherein the locations of the gain values of gain tables corresponding to a second color are offset from the locations of the gain values of gain tables corresponding to a first color by a first distance in a first direction, and wherein the locations of gain values of gain tables corresponding to a third color are offset from the locations of the gain values of gain tables corresponding to the first color by a second distance in a second direction.

14. The LSC circuit of claim 10, wherein the LSC circuit determines, for each pixel in a pixel tile, a pixel gain value from the set of gain tables corresponding to a color of the pixel tile further by:
   determining a color channel corresponding to the first pixel; and
   identifying the first gain table based on the color channel corresponding to the first pixel.

15. The LSC circuit of claim 10, wherein the LSC circuit determines, for each pixel in a pixel tile, a pixel gain value from the set of gain tables corresponding to a color of the pixel tile further by:
   identifying, based on the location of a second pixel of the pixel tile, a second plurality of gain values from a second gain table of the set of gain tables corresponding to the color of the pixel tile, wherein the second plurality of gain values includes a third gain value associated with the first location within the image sensor and a fourth gain value associated with the second location within the image sensor,
   determining a second pixel gain value for the second pixel of the pixel tile by interpolating the second plurality of gain values, and
   scaling the second pixel by the determined second pixel gain.

16. The LSC circuit of claim 10, wherein the first plurality of gain values further includes a third gain value associated with a third location within the image sensor, and a fourth gain value associated with a fourth location within the image sensor, and wherein the LSC circuit determines the first pixel gain value by:
   generating a first interpolated gain value by interpolating the first gain value and the second gain value in a first direction based on a horizontal position of the first gain value, a horizontal position of the second gain value, and a horizontal position of the pixel,
   generating a second interpolated gain value by interpolating the third gain value and the fourth gain value in the first direction based on a horizontal position of the third gain value, a horizontal position of the fourth gain value, and the horizontal position of the pixel, and
   generating the pixel gain value by interpolating the first interpolated gain value and the second interpolated gain value based on a vertical position of the first gain value, a vertical position of the third gain value, and a vertical position of the pixel.

17. The LSC circuit of claim 10, further configured to:
   send the determined pixel gain values to a highlight recovery circuit, wherein the pixel gain values correspond to pixels that are ahead from pixels being processed by the highlight recovery circuit by a set number of lines.

18. The LSC circuit of claim 17, wherein the highlight recovery circuit receives one pixel value corresponding to each color of the plurality of colors supported by the image sensor from a demosaicing circuit, and one pixel gain value for each color of the plurality of colors supported by the image sensor from the LSC circuit for processing each of the received pixel values.

19. A system comprising:
   an image sensor comprising a plurality of pixel tiles, each pixel tile including a plurality of pixels corresponding to a same color; and
   a lens shading correction (LSC) circuit for processing pixels of a version of an image captured by the image sensor, the LSC circuit configured to:
      for each color of a plurality of colors, receive a set of gain tables, each gain table corresponding to a different channel associated with the color, each gain table including a set of gain values, each gain value associated with a location; and
      determine, for each pixel in a pixel tile, a pixel gain value from the set of gain tables corresponding to a color of the pixel tile comprising:
         identify, based on the location of a first pixel of the pixel tile, a first plurality of gain values from a first gain table of the set of gain tables corresponding to the color of the pixel tile, wherein the first plurality of gain values includes a first gain value associated with a first location within the image sensor and a second gain value associated with a second location within the image sensor,
         determine a first pixel gain value for the first pixel of the pixel tile by interpolating the first plurality of gain values, and
      scale each pixel in the pixel tile based on the determined pixel gain values.

20. The system of claim 19, wherein the gain values of gain tables corresponding to a same color are associated with a same set of locations and wherein the gain values of gain tables corresponding to different colors are associated with a different set of locations.

* * * * *